US012597846B2

(12) United States Patent
Kajiwara et al.

(10) Patent No.: US 12,597,846 B2
(45) Date of Patent: Apr. 7, 2026

(54) POWER CONVERSION SYSTEM INCLUDING POWER CONVERSION DEVICES AND A MASTER CONTROLLER FOR PERFORMING POWER CONVERSION BASED ON A SAME CONTROL COMMAND

(71) Applicant: KABUSHIKI KAISHA YASKAWA DENKI, Fukuoka (JP)

(72) Inventors: Shinsuke Kajiwara, Fukuoka (JP); Mio Kisaki, Fukuoka (JP); Taiga Akiyama, Fukuoka (JP); Satoshi Sueshima, Fukuoka (JP); Takeshi Horibe, Fukuoka (JP); Kazumasa Ikeda, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 346 days.

(21) Appl. No.: 18/251,350

(22) PCT Filed: Oct. 26, 2021

(86) PCT No.: PCT/JP2021/039492
§ 371 (c)(1),
(2) Date: May 1, 2023

(87) PCT Pub. No.: WO2022/097538
PCT Pub. Date: May 12, 2022

(65) Prior Publication Data
US 2024/0006974 A1    Jan. 4, 2024

(30) Foreign Application Priority Data
Nov. 6, 2020    (JP) ................................. 2020-185917

(51) Int. Cl.
*H02M 1/00*         (2007.01)

(52) U.S. Cl.
CPC ... *H02M 1/009* (2021.05); *G05B 2219/21039* (2013.01)

(58) Field of Classification Search
CPC ... H02M 1/0009; H02M 1/0067; H02M 1/007
See application file for complete search history.

(56) References Cited

U.S. PATENT DOCUMENTS

2003/0184250 A1* 10/2003 Kurokawa ......... G05B 19/4141
                                                                    318/560
2014/0020375 A1    1/2014 Fujishima et al.
                          (Continued)

FOREIGN PATENT DOCUMENTS

JP          H09163728 A  *  6/1997  ............ H02M 3/155
JP          2008228548 A  *  9/2008
                          (Continued)

OTHER PUBLICATIONS

JP2013207831 Translation (Year: 2013).*
                          (Continued)

*Primary Examiner* — Thienvu V Tran
*Assistant Examiner* — Jennifer C Caulk
(74) *Attorney, Agent, or Firm* — Osha Bergman Watanabe & Burton LLP

(57)              ABSTRACT

A power conversion system comprises: a plurality of power conversion devices; and a master controller capable of communicating with the plurality of power conversion devices by a serial communication channel. The master controller transmits the same control command to the plurality of power conversion devices by serial communication via the serial communication channel, and the plurality of power conversion devices each perform power conversion from the primary side to the secondary side on the basis of the same control command.

19 Claims, 21 Drawing Sheets

(56)                        References Cited

U.S. PATENT DOCUMENTS

| | | | | |
|---|---|---|---|---|
| 2014/0129026 A1* | 5/2014 | Scholler | ................ | B65G 47/52 |
| | | | | 700/230 |
| 2014/0203756 A1 | 7/2014 | Kajiura et al. | | |

FOREIGN PATENT DOCUMENTS

| | | | | | | |
|---|---|---|---|---|---|---|
| JP | 2013207831 | A | * | 10/2013 | | |
| JP | 2016100991 | A | * | 5/2016 | | |
| JP | 2022-560734 | | | 10/2021 | | |
| KR | 20140049287 | A | * | 4/2014 | ................ | H02J 3/36 |
| WO | WO-2013190609 | A1 | * | 12/2013 | ............ | H02M 7/493 |
| WO | WO-2015050093 | A1 | * | 4/2015 | ............. | H02J 1/102 |
| WO | WO-2015056491 | A1 | * | 4/2015 | ......... | H02M 7/4807 |
| WO | WO-2019026764 | A1 | * | 2/2019 | ................ | H02J 3/32 |

OTHER PUBLICATIONS

KR20140049287 Translation (Year: 2014).*
JPH09163728 Translation (Year: 1997).*
JP2008228548 Translation (Year: 2008).*
Office Action issued in corresponding Indian Patent Application No. 202317028410, dated Jun. 17, 2025 (6 pages).
Hearing Notice issued in counterpart Indian Patent Application No. 202317028410 mailed Oct. 6, 2025 (2 pages).

* cited by examiner

POWER CONVERSION SYSTEM INCLUDING POWER CONVERSION DEVICES AND A MASTER CONTROLLER FOR PERFORMING POWER CONVERSION BASED ON A SAME CONTROL COMMAND

TECHNICAL FIELD

The present disclosure relates to a power conversion system.

BACKGROUND ART

Patent Document 1 discloses an inverter system including a master inverter connected to a motor, and one or more slave inverters connected to the master inverter via a half-duplex communication line and connected to the motor in parallel with the master inverter.

CITATION LIST

Patent Literature

Patent Document 1: WO 2013/190609

SUMMARY OF INVENTION

Technical Problem

The present disclosure provides a power conversion system that is effective in achieving both device configuration flexibility and control reliability.

Solution to Problem

A power conversion system according to one aspect of the present disclosure includes: a plurality of power conversion devices; and a master controller capable of communicating with the plurality of power conversion devices by a serial communication system, wherein the master controller transmits the same control command to the plurality of power conversion devices by serial communication via the serial communication system, and each of the plurality of power conversion devices performs power conversion from primary power to secondary power based on the same control command.

A power conversion system according to another aspect of the present disclosure includes: a plurality of power conversion devices; a master controller capable of communicating with the plurality of power conversion devices by a communication system and a start command system different from the communication system, wherein the master controller transmits the same control command to the plurality of power conversion devices via the communication system, when each of the plurality of power conversion devices receives the same control command, each of the plurality of power conversion devices transmits a reception notification of the same control command to the master controller via a serial communication system, when the master controller receives the reception notification from all of the plurality of power conversion devices, the master controller transmits a start command to the plurality of power conversion devices by the start command system, and when each of the plurality of power conversion devices receives the start command, each of the plurality of power conversion devices starts power conversion based on the same received control command.

Advantageous Effects of Invention

According to the present disclosure, it is possible to provide a power conversion system that is effective in achieving both device configuration flexibility and control reliability.

DESCRIPTION OF EMBODIMENTS

Hereinafter, embodiments will be described in detail with reference to the drawings. In the description, elements which are the same or have the same function are given the same reference signs, and redundant descriptions thereof are omitted.

Power Conversion System

Figure 1:
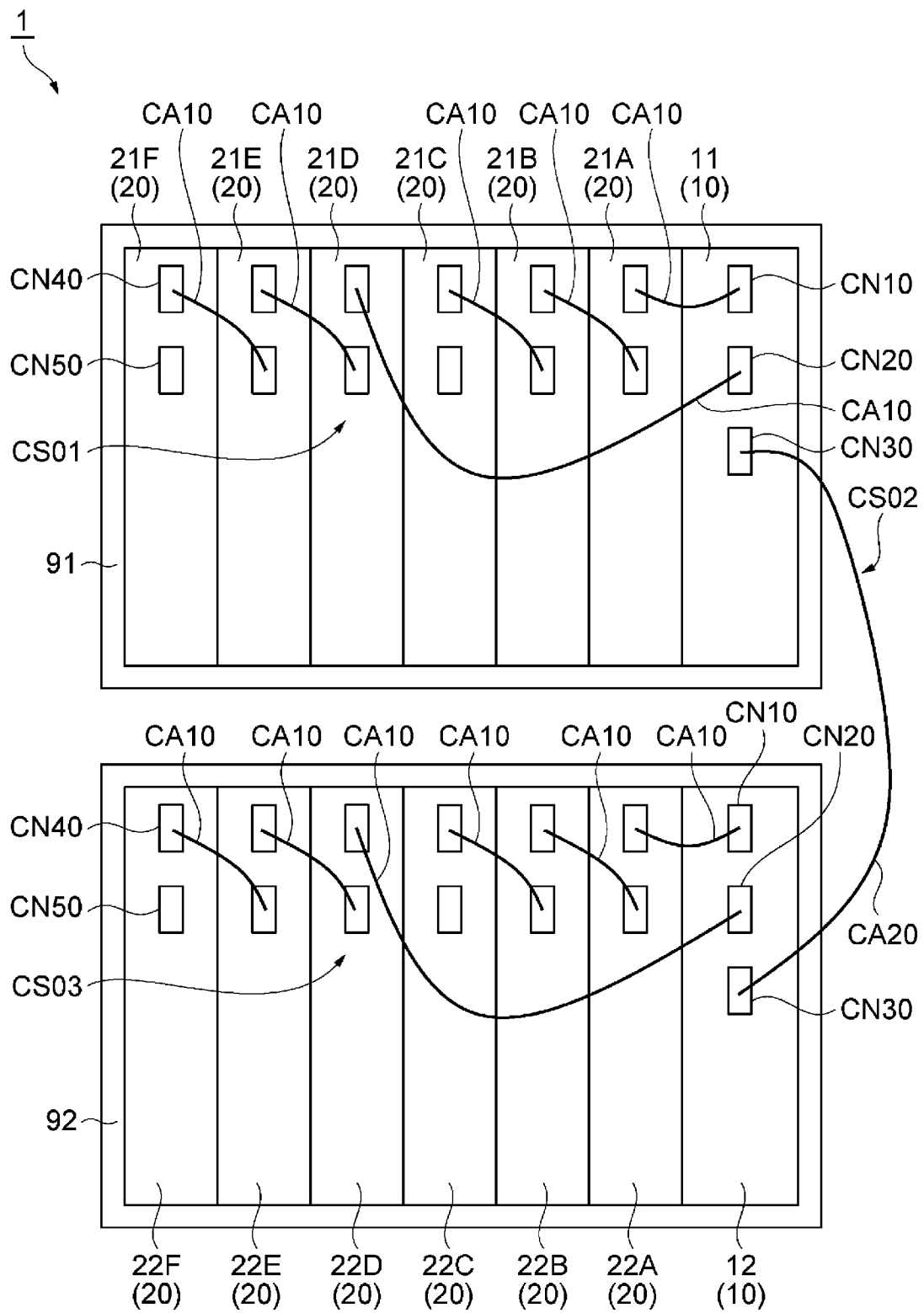
FIG. 1 is a schematic diagram illustrating a schematic configuration of a power conversion system.

A power conversion system illustrated in FIG. 1 is a system that converts primary power into secondary power by collectively controlling a plurality of power conversion devices with a master controller. In this manner, a configuration in which the plurality of power conversion devices are collectively controlled by the master controller is effective in improving control reliability.

In order to cope with more various needs for the secondary power, it is desirable to be able to flexibly change the number of power conversion devices collectively controlled by the master controller. Correspondingly, a power conversion system 1 includes a plurality of power conversion devices 20 and a master controller 10 capable of communicating with the plurality of power conversion devices 20 by a serial communication system, the master controller 10 transmits the same control command to the plurality of power conversion devices 20 by serial communication via the serial communication system, and each of the plurality of power conversion devices 20 performs power conversion from primary power to secondary power based on the same control command. The primary power and the secondary power may be alternating current power or direct current power. As an example, both the primary power and the secondary power are three-phase alternating current power.

By using a serial communication system for the transmission of the same control command from the master controller 10 to the power conversion devices 20, flexibility in the number of power conversion devices 20 can be improved. Therefore, the power conversion system 1 is effective in achieving both device configuration flexibility and control reliability. The control command may be, for example, a voltage command for a secondary voltage or a current command for a secondary current.

The serial communication system is a system that performs transmission and reception of serial data between the master controller 10 and the plurality of power conversion devices 20. The serial communication system may be a wired system or a wireless system. The wired serial communication system is constituted by one or more communication lines. The wireless serial communication system is constituted by a transceiver for a wireless signal in a predetermined frequency band.

The plurality of power conversion devices 20 may include a first power conversion device and a second power conversion device capable of communicating with the first power conversion device by the serial communication system, the master controller 10 may transmit the same control command to the first power conversion device by serial communication via the serial communication system, and the first power conversion device may transmit the same control command received from the master controller 10 to the second power conversion device by serial communication via the serial communication system.

The master controller 10 may receive feedback signals from the plurality of power conversion devices 20 by serial communication via the serial communication system and generate the same control command based on the received feedback signal. The feedback signal is, for example, a signal indicating a state of a secondary side of the power conversion device 20. Specific examples of the signal indicating the state of the secondary side of the power conversion device 20 include a detection value of the secondary current. As a specific example of generating the same control command based on the feedback signal, the master controller 10 may generate the voltage command based on the secondary current.

The plurality of power conversion devices 20 may include the first power conversion device and the second power conversion device capable of communicating with the first power conversion device by the serial communication system, the second power conversion device may transmit the second feedback signal to the first power conversion device by serial communication via the serial communication system, and the first power conversion device may transmit the first feedback signal, and the second feedback signal received from the second power conversion device, to the master controller 10 by serial communication via the serial communication system. The power conversion system 1 may further include a housing 91 that accommodates the plurality of power conversion devices 20 and the master controller 10.

In a configuration in which the plurality of power conversion devices 20 are collectively controlled by the master controller 10, it may be required to cause the plurality of power conversion devices 20 to simultaneously start power conversion in response to the same control command. For example, when power is supplied from the plurality of power conversion devices 20 to one load, in order to suppress a circulating current between the plurality of power conversion devices 20, it is required to cause the plurality of power conversion devices 20 to simultaneously start power conversion in response to the same control command.

However, in data communication (for example, the above-described serial communication), it may be difficult for the plurality of power conversion devices 20 to simultaneously receive the same control command from the master controller 10.

Correspondingly, the master controller 10 may transmit the same control command to the plurality of power conversion devices 20 via the communication system (for example, the above-described serial communication system), each of the plurality of power conversion devices 20 may transmit a reception notification of the same control command to the master controller 10 via the communication system when receiving the same control command, the master controller 10 may transmit a start command to the plurality of power conversion devices 20 by a start command system different from the communication system when receiving the reception notifications from all of the plurality of power conversion devices 20, and each of the plurality of power conversion devices 20 may start power conversion based on the same received control command when receiving the start command. As a result, after waiting for all the power conversion devices 20 to receive the same control command, the power conversion devices 20 can simultaneously start power conversion based on the same control command.

As an example, the master controller 10 includes a master-to-slave connector CN10 and a master-to-slave connector CN20. The master-to-slave connectors CN10 and CN20 are connectors for communication with the power conversion devices 20. Each of the plurality of power conversion devices 20 has an upper connector CN40 and a lower connector CN50. The upper connector CN40 is a connector for communication with the master controller 10. The lower connector CN50 is a connector for relaying another power conversion device 20 to the master controller 10.

The upper connector CN40 can be connected to the master-to-slave connector CN10 or the master-to-slave connector CN20 of the master controller 10 by a master-to-slave cable CA10. When the upper connector CN40 is connected to the master-to-slave connector CN10 or the master-to-slave connector CN20, a wired serial communication system is configured between the master controller 10 and the power conversion device 20.

The upper connector CN40 can also be connected to the lower connector CN50 of another power conversion device 20. When the upper connector CN40 of the power conversion device 20 is connected to the lower connector CN50 of another power conversion device 20, the other power conversion device 20 is referred to as an "upper power conversion device 20". When the lower connector CN50 of the power conversion device 20 is connected to the upper connector CN40 of another power conversion device 20, the other power conversion device 20 is referred to as a "lower power conversion device 20".

When the upper connector CN40 of the power conversion device 20 is connected to the lower connector CN50 of the upper power conversion device 20, a wired serial communication system is configured between the power conversion device 20 and the upper power conversion device 20, and serial communication can be performed with the upper power conversion device 20 via the serial communication system. When the lower connector CN50 of the power conversion device 20 is connected to the upper connector CN40 of the lower power conversion device 20, a wired serial communication system is configured between the power conversion device 20 and the lower power conversion device 20, and serial communication can be performed with the lower power conversion device 20 via the serial communication system.

With this configuration, the plurality of power conversion devices 20 can be connected to each of the master-to-slave connectors CN10 and CN20. In the illustrated example, the number of power conversion devices 20 that can be connected to each of the master-to-slave connectors CN10 and CN20 is three.

As an example, FIG. 1 illustrates a case where three power conversion devices 20 are connected to the master-to-slave connector CN10 and three power conversion devices 20 are connected to the master-to-slave connector CN20. Hereinafter, the three power conversion devices 20 connected to the master-to-slave connector CN10 are distinguished from each other as power conversion devices 21A, 21B, and 21C. In addition, the three power conversion devices 20 connected to the master-to-slave connector CN20 are distinguished from each other as power conversion devices 21D, 21E, and 21F. The master controller 10 and the power conversion devices 21A, 21B, 21C, 21D, 21E, and 21F are accommodated in one housing 91.

In the power conversion devices 21A, 21B, and 21C, the upper connector CN40 of the power conversion device 21A (first power conversion device) is connected to the master-to-slave connector CN10 of the master controller 10 by the master-to-slave cable CA10. The upper connector CN40 of the power conversion device 21B (second power conversion device) is connected to the lower connector CN50 of the power conversion device 21A by the master-to-slave cable CA10. The upper connector CN40 of the power conversion device 21C (second power conversion device) is connected to the lower connector CN50 of the power conversion device 21B by the master-to-slave cable CA10.

In the power conversion devices 21D, 21E, and 21F, the upper connector CN40 of the power conversion device 21D (first power conversion device) is connected to the master-to-slave connector CN20 of the master controller 10 by the master-to-slave cable CA10. The upper connector CN40 of the power conversion device 21E (second power conversion device) is connected to the lower connector CN50 of the power conversion device 21D by the master-to-slave cable CA10. The upper connector CN40 of the power conversion device 21F (second power conversion device) is connected to the lower connector CN50 of the power conversion device 21E by the master-to-slave cable CA10.

With the above-described connection relationship, a serial communication system CS01 is configured between the master controller 10 and the power conversion devices 21A, 21B, 21C, 21D, 21E, and 21F, and the master controller 10 is capable of communicating with the power conversion devices 21A, 21B, 21C, 21D, 21E, and 21F by the serial communication system CS01.

The master controller 10 transmits the same control command to the power conversion devices 21A, 21B, 21C, 21D, 21E, and 21F by serial communication via the serial communication system CS01. For example, the master controller 10 transmits a control command from the master-to-slave connector CN10 to the power conversion device 21A. The power conversion device 21A transmits the control command received from the master controller 10 to the power conversion device 21B by serial communication via the serial communication system CS01. As a result, the same control command is transmitted from the master controller 10 to the power conversion devices 21A and 21B via the serial communication system CS01. The power conversion device 21B transmits the control command received from the power conversion device 21A to the power conversion device 21C by serial communication via the serial communication system CS01. As a result, the same control command is transmitted from the master controller 10 to the power conversion devices 21A, 21B, and 21C via the serial communication system CS01.

The master controller 10 transmits, from the master-to-slave connector CN20 to the power conversion device 21D, the same control command as the control command transmitted to the power conversion device 21A. The power conversion device 21D transmits the control command received from the master controller 10 to the power conversion device 21E by serial communication via the serial communication system CS01. As a result, the same control command is transmitted from the master controller 10 to the power conversion devices 21D and 21E via the serial communication system CS01. The power conversion device 21E transmits the control command received from the power conversion device 21D to the power conversion device 21F by serial communication via the serial communication system CS01. As a result, the same control command is transmitted from the master controller 10 to the power conversion devices 21D, 21E, and 21F via the serial communication system CS01.

The master controller 10 receives a plurality of feedback signals from the power conversion devices 21A, 21B, 21C, 21D, 21E, and 21F by serial communication via the serial communication system CS01. For example, the power conversion device 21C transmits an own device feedback signal to the power conversion device 21B by serial communication via the serial communication system CS01. The power conversion device 21B transmits an own device feedback signal and the feedback signal received from the power conversion device 21C to the power conversion device 21A by serial communication via the serial communication system CS01. The power conversion device 21A transmits an own device feedback signal and the feedback signal received from the power conversion device 21B to the master controller 10 by serial communication via the serial communication system CS01. Thus, the feedback signals from the power conversion devices 21A, 21B, and 21C are received by the master controller 10 via the master-to-slave connector CN10.

The power conversion device 21F transmits an own device feedback signal to the power conversion device 21E by serial communication via the serial communication system CS01. The power conversion device 21E transmits an own device feedback signal and the feedback signal received from the power conversion device 21F to the power conversion device 21D by serial communication via the serial communication system CS01. The power conversion device 21D transmits an own device feedback signal and the feedback signal received from the power conversion device 21E to the master controller 10 by serial communication via the serial communication system CS01. Thus, the feedback signals from the power conversion devices 21D, 21E, and 21F are received by the master controller 10 via the master-to-slave connector CN20.

The master controller 10 generates the same control command based on the feedback signals received from the power conversion devices 21A, 21B, 21C, 21D, 21E, and 21F, and transmits the same generated control command to the power conversion devices 21A, 21B, 21C, 21D, 21E, and 21F by serial communication via the serial communication system CS01.

The power conversion system 1 may further include the plurality of power conversion devices 20 of a second group, and the master controller 10 capable of communicating with the plurality of power conversion devices 20 of the second group by a third serial communication system. Hereinafter, the above-described master controller 10 capable of communicating with the plurality of power conversion devices 20 by the serial communication system is referred to as a master controller 11, and the master controller 10 capable of communicating with the plurality of power conversion devices 20 of the second group by the third serial communication system is referred to as a master controller 12, which are distinguished from each other.

The master controller 12 (second master controller) may be capable of communicating with the master controller 11 by the second serial communication system. The master controller 11 may transmit the same control command to the plurality of power conversion devices 20 by serial communication via the serial communication system and transmit the same control command to the master controller 12 by serial communication via the second serial communication system, and the master controller 12 may receive the same control command from the master controller 11 and transmit the same received control command to the plurality of power conversion devices 20 of the second group by serial communication via the third serial communication system.

The master controller 12 may receive feedback signals of a second group from the plurality of power conversion devices 20 of the second group by serial communication via the third serial communication system, and transmit the received feedback signals of the second group to the master controller 11 by serial communication via the second serial communication system. The master controller 11 may receive feedback signals of a first group from the plurality of power conversion devices 20 by serial communication via the serial communication system, receive the feedback signals of the second group from the master controller 12 by serial communication via the second serial communication system, and generate the same control command based on the feedback signals of the first group and the feedback signals of the second group. The second serial communication system and the third serial communication system may each be a wired system or a wireless system.

As an example, FIG. 1 illustrates a case where three power conversion devices 20 of the second group are connected to the master-to-slave connector CN10 of the master controller 12, and three power conversion devices 20 of the second group are connected to the master-to-slave connector CN20 of the master controller 12. Hereinafter, the three power conversion devices 20 connected to the master-to-slave connector CN10 of the master controller 12 are distinguished from each other as power conversion devices 22A, 22B, and 22C. The three power conversion devices 20 connected to the master-to-slave connector CN20 of the master controller 12 are distinguished from each other as power conversion devices 22D, 22E, and 22F. The master controller 12 and the power conversion devices 22A, 22B, 22C, 22D, 22E, and 22F are accommodated in one housing 92.

In the power conversion devices 22A, 22B, and 22C, the upper connector CN40 of the power conversion device 22A (first power conversion device) is connected to the master-to-slave connector CN10 of the master controller 12 by the master-to-slave cable CA10. The upper connector CN40 of the power conversion device 22B (second power conversion device) is connected to the lower connector CN50 of the power conversion device 22A by the master-to-slave cable CA10. The upper connector CN40 of the power conversion device 22C (second power conversion device) is connected to the lower connector CN50 of the power conversion device 22B by the master-to-slave cable CA10.

In the power conversion devices 22D, 22E, and 22F, the upper connector CN40 of the power conversion device 22D (first power conversion device) is connected to the master-to-slave connector CN20 of the master controller 12 by the master-to-slave cable CA10. The upper connector CN40 of the power conversion device 22E (second power conversion device) is connected to the lower connector CN50 of the power conversion device 22D by the master-to-slave cable CA10. The upper connector CN40 of the power conversion device 22F (second power conversion device) is connected to the lower connector CN50 of the power conversion device 22E by the master-to-slave cable CA10.

With the above-described connection relationship, a third serial communication system CS03 is configured between the master controller 12 and the power conversion devices 22A, 22B, 22C, 22D, 22E, and 22F, and the master controller 12 is capable of communicating with the power conversion devices 22A, 22B, 22C, 22D, 22E, and 22F by the third serial communication system CS03.

Each of the master controllers 11 and 12 further includes a master-to-master connector CN30. The master-to-master connector CN30 is a connector for communication between the master controllers 10. The master-to-master connector CN30 of the master controller 12 is connected to the master-to-master connector CN30 of the master controller 11 by a master-to-master cable CA20. Accordingly, a second serial communication system CS02 is configured between the master controller 12 and the master controller 11, and the master controller 12 is capable of communicating with the master controller 11 by the second serial communication system CS02.

The master controller 11 transmits the same control command (the same control command as the control command transmitted to the power conversion device 21A) to the master controller 12 by serial communication via the second serial communication system CS02. The master controller 12 receives the same control command from the master controller 11 via the master-to-master connector CN30, and transmits the same received control command to the power conversion devices 22A, 22B, 22C, 22D, 22E, and 22F by serial communication via the third serial communication system CS03.

For example, the master controller 12 transmits the same control command from the master-to-slave connector CN10 to the power conversion device 22A. The power conversion device 22A transmits the control command received from the master controller 12 to the power conversion device 22B by serial communication via the third serial communication system CS03. As a result, the same control command is transmitted from the master controller 12 to the power conversion devices 22A and 22B via the third serial communication system CS03. The power conversion device 22B transmits the control command received from the power conversion device 22A to the power conversion device 22C by serial communication via the third serial communication system CS03. As a result, the same control command is transmitted from the master controller 12 to the power conversion devices 22A, 22B, and 22C via the third serial communication system CS03.

Similarly, the master controller 12 transmits the same control command from the master-to-slave connector CN20 to the power conversion device 22D. The power conversion device 22D transmits the control command received from the master controller 12 to the power conversion device 22E by serial communication via the third serial communication system CS03. As a result, the same control command is transmitted from the master controller 12 to the power conversion devices 22D and 22E via the third serial communication system CS03. The power conversion device 22E transmits the control command received from the power conversion device 22D to the power conversion device 22F by serial communication via the third serial communication system CS03. As a result, the same control command is transmitted from the master controller 12 to the power conversion devices 22D, 22E, and 22F via the third serial communication system CS03.

The master controller 12 receives a plurality of feedback signals from the power conversion devices 22A, 22B, 22C, 22D, 22E, and 22F by serial communication via the third serial communication system CS03. For example, the power conversion device 22C transmits an own device feedback signal to the power conversion device 22B by serial communication via the third serial communication system CS03. The power conversion device 22B transmits an own device feedback signal and the feedback signal received from the power conversion device 22C to the power conversion device 22A by serial communication via the third serial communication system CS03. The power conversion device 22A transmits an own device feedback signal and the feedback signal received from the power conversion device 22B to the master controller 12 by serial communication via the third serial communication system CS03. Thus, the feedback signals from the power conversion devices 22A, 22B, and 22C are received by the master controller 12 via the master-to-slave connector CN10.

The power conversion device 22F transmits an own device feedback signal to the power conversion device 22E by serial communication via the third serial communication system CS03. The power conversion device 22E transmits an own device feedback signal and the feedback signal received from the power conversion device 22F to the power conversion device 22D by serial communication via the third serial communication system CS03. The power conversion device 22D transmits an own device feedback signal and the feedback signal received from the power conversion device 22E to the master controller 12 by serial communication via the third serial communication system CS03. Thus, the feedback signals from the power conversion devices 22D, 22E, and 22F are received by the master controller 12 via the master-to-slave connector CN20.

The master controller 12 transmits the feedback signals of the second group received from the power conversion devices 22A, 22B, 22C, 22D, 22E, and 22F to the master controller 11 by serial communication via the second serial communication system CS02.

The master controller 11 receives the feedback signals of the first group from the power conversion devices 21A, 21B, 21C, 21D, 21E, and 21F by serial communication via the serial communication system CS01, receives the feedback signals of the second group from the master controller 12 by serial communication via the second serial communication system CS02, and generates the same control command based on the feedback signals of the first group and the feedback signals of the second group.

The master controller 11 transmits the same generated control command to the power conversion devices 21A, 21B, 21C, 21D, 21E, and 21F by serial communication via the serial communication system CS01, and transmits the same control command to the master controller 12 by serial communication via the second serial communication system CS02. The master controller 12 transmits the same control command received from the master controller 11 to the power conversion devices 22A, 22B, 22C, 22D, 22E, and 22F by serial communication via the third serial communication system CS03.

The master controller 10 may be configured to switch the operation mode between a primary mode and a secondary mode so that the master controller 10 can function as any of the master controllers 11 and 12 described above. For example, the master controller 10 performs switching between the primary mode and the secondary mode based on the setting of the user. The primary mode is a mode in which the master controller 10 is caused to function as the master controller 11, and the secondary mode is a mode in which the master controller 10 is caused to function as the master controller 12.

In the primary mode, the master controller 10 transmits the same control command to the plurality of power conversion devices 20 by serial communication via the serial communication system CS01, and transmits the same control command to the master controller 12 (second master controller) by serial communication via the second serial communication system CS02. In the secondary mode, the master controller 10 receives the same control command from the master controller 11 (second master controller) by serial communication via the second serial communication system CS02, and transmits the same received control command to the plurality of power conversion devices 20 by serial communication via the third serial communication system CS03.

In the primary mode, the master controller 10 may receive the feedback signals of the first group from the plurality of power conversion devices 20 by serial communication via the serial communication system CS01, receive the feedback signals of the second group from the master controller 12 (second master controller) by serial communication via the second serial communication system CS02, and generate the same control command based on the feedback signals of the first group and the feedback signals of the second group.

In the secondary mode, the master controller 10 may receive the feedback signals from the plurality of power conversion devices 20 of the second group by serial communication via the third serial communication system CS03, and may transmit the received feedback signals to the master controller 11 (second master controller) by serial communication via the second serial communication system CS02.

Figure 2:
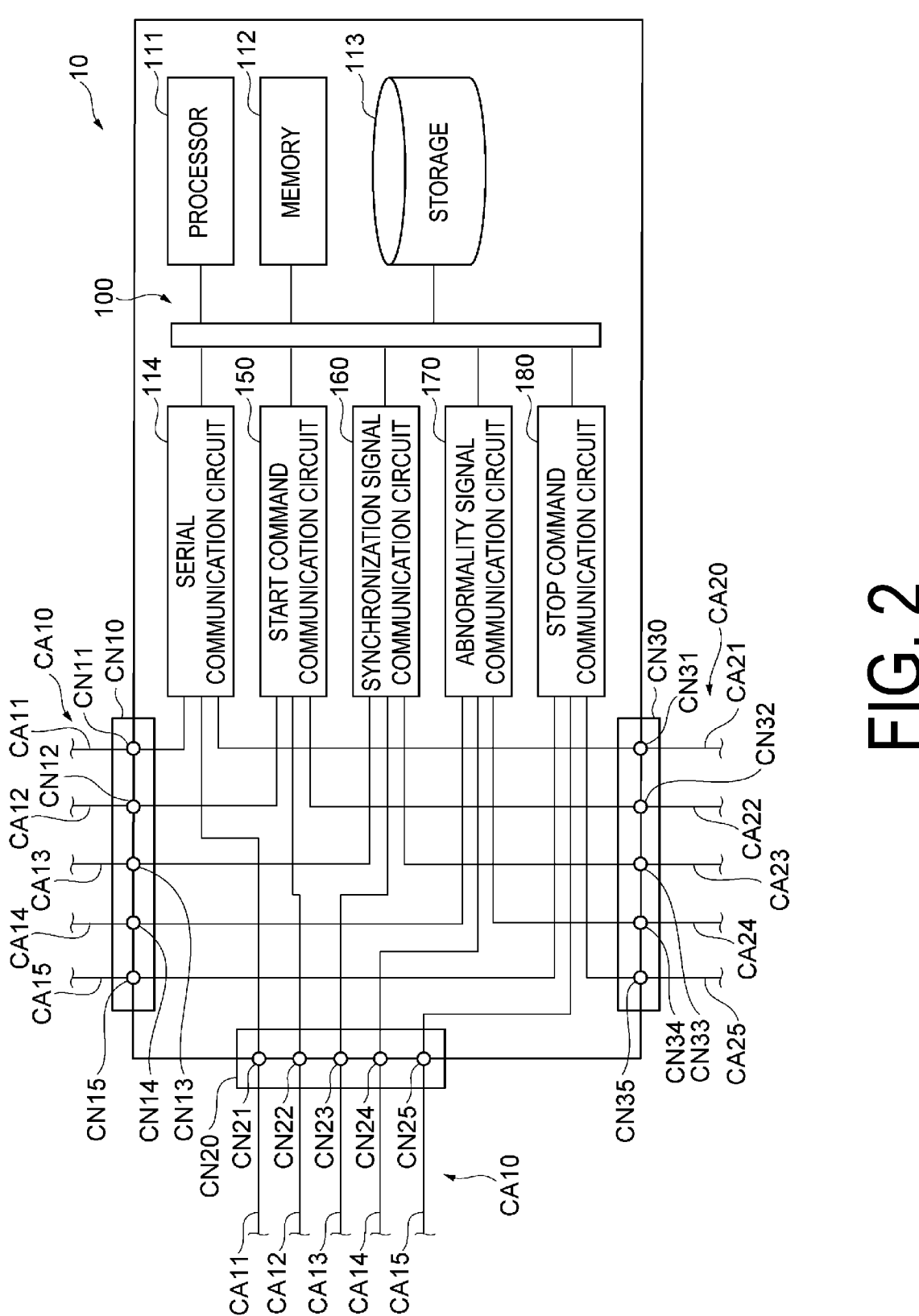
FIG. 2 is a schematic diagram illustrating a configuration of a master controller.

FIG. 2 is a schematic diagram illustrating a configuration of the master controller 10. As illustrated in FIG. 2, the master controller 10 further includes a master control circuit 100 in addition to the master-to-slave connectors CN10 and CN20 and the master-to-master connector CN30 described above.

The master-to-slave connector CN10 includes a serial communication port CN11. The master-to-slave connector CN20 includes a serial communication port CN21. The master-to-slave cable CA10 includes a serial communication line CA11 connected to the serial communication ports CN11 and CN21. The serial communication ports CN11 and CN21 and the serial communication line CA11 constitute at least a part of the serial communication system CS01 or the third serial communication system CS03.

The master-to-master connector CN30 includes a serial communication port CN31. The master-to-master cable CA20 includes a serial communication line CA21 connected to the serial communication port CN31. The serial communication port CN31 and the serial communication line CA21 constitute at least a part of the second serial communication system CS02.

The master control circuit 100 includes a processor 111, a memory 112, a storage 113, and a serial communication circuit 114. The serial communication circuit 114 is connected to the serial communication port CN11 of the master-to-slave connector CN10, the serial communication port CN21 of the master-to-slave connector CN20, and the serial communication port CN31 of the master-to-master connector CN30.

In the master controller 11 in the primary mode, the serial communication circuit 114 is connected to the serial communication system CS01 via the serial communication ports CN11 and CN21, and performs serial communication with the plurality of power conversion devices 20 via the serial communication system CS01. The serial communication circuit 114 is connected to the second serial communication system CS02 via the serial communication port CN31, and performs serial communication with the master controller 12 via the second serial communication system CS02.

In the master controller 12 in the secondary mode, the serial communication circuit 114 is connected to the third serial communication system CS03 via the serial communication ports CN11 and CN21, and performs serial communication with the plurality of power conversion devices 20 via the third serial communication system CS03. Further, the serial communication circuit 114 is connected to the second serial communication system CS02 via the serial communication port CN31, and performs serial communication with the master controller 11 via the second serial communication system CS02.

The storage 113 includes one or more computer-readable storage media such as a nonvolatile semiconductor memory or a hard disk drive. The storage 113 stores a program for causing the master control circuit 100 to transmit the control command from the serial communication circuit 114 to the plurality of power conversion devices 20 by serial communication via the serial communication ports CN11 and CN21.

The program stored in the storage 113 may be configured to further cause the master control circuit 100 to receive the feedback signals to the serial communication circuit 114 from the plurality of power conversion devices 20 by serial communication via the serial communication ports CN11 and CN21, and to generate the control command based on the received feedback signals.

The program stored in the storage 113 may further cause the master control circuit 100 to switch the operation mode between the primary mode and the secondary mode, cause the master control circuit 100 to, in the primary mode, transmit the control command from the serial communication circuit 114 to the plurality of power conversion devices 20 by serial communication via the serial communication ports CN11 and CN21, and to transmit the control command from the serial communication circuit 114 to the master controller 12 by serial communication via the serial communication port CN31, and cause the master control circuit 100 to, in the secondary mode, receive the control command to the serial communication circuit 114 from the master controller 11 by serial communication via the second serial communication system CS02, and to transmit the received control command to the plurality of power conversion devices 20 by serial communication via the serial communication ports CN11 and CN21.

The program stored in the storage 113 may be configured to cause the master control circuit 100 to further execute, in the primary mode, receiving the feedback signals of the first group to the serial communication circuit 114 from the plurality of power conversion devices 20 by serial communication via the serial communication ports CN11 and CN21, receiving the feedback signals of the second group to the serial communication circuit 114 from the master controller 12 by serial communication via the serial communication port CN31, and generating the control command based on the feedback signals of the first group and the feedback signals of the second group. The program stored in the storage 113 may be configured to cause the master control circuit 100 to further execute, in the secondary mode, receiving feedback signals from the plurality of power conversion devices 20 of the second group by serial communication via the serial communication ports CN11 and CN21, and transmitting the received feedback signals from the serial communication circuit 114 to the master controller 11 by serial communication via the serial communication port CN31.

The memory 112 includes one or more computer-readable temporary storage media such as a random access memory (RAM). The memory 112 temporarily stores a program loaded from the storage 113, a calculation result by the processor 111, and the like. The processor 111 includes one or more arithmetic processing devices and executes the program in cooperation with the memory 112.

Thus, the processor 111 transmits the control command from the serial communication circuit 114 to the plurality of power conversion devices 20 by serial communication via the serial communication ports CN11 and CN21. The processor 111 may further execute causing the serial communication circuit 114 to receive the feedback signals from the plurality of power conversion devices 20 by serial communication via the serial communication ports CN11 and CN21, and generating the control command based on the feedback signals received by the serial communication circuit 114.

The processor 111 may switch the operation mode between the primary mode and the secondary mode. In the primary mode, the processor 111 may transmit the control command from the serial communication circuit 114 to the plurality of power conversion devices 20 by serial communication via the serial communication ports CN11 and CN21, and may transmit the control command from the serial communication circuit 114 to the master controller 12 by serial communication via the serial communication port CN31. In the secondary mode, the processor 111 may cause the serial communication circuit 114 to receive the control command from the master controller 11 by serial communication via the serial communication port CN31, and may cause the serial communication circuit 114 to transmit the control command received by the serial communication circuit 114 to the plurality of power conversion devices 20 of the second group by serial communication via the serial communication ports CN11 and CN21.

In the primary mode, the processor 111 may cause the serial communication circuit 114 to receive the feedback signals of the first group from the plurality of power conversion devices 20 by serial communication via the serial communication ports CN11 and CN21, cause the serial communication circuit 114 to receive the feedback signals of the second group from the master controller 12 by serial communication via the serial communication port CN31, and generate the control command based on the feedback signals of the first group and the feedback signals of the second group. In the secondary mode, the processor 111 may cause the serial communication circuit 114 to receive the feedback signals from the plurality of power conversion devices 20 of the second group by serial communication via the serial communication ports CN11 and CN21, and may cause the serial communication circuit 114 to transmit the feedback signals received by the serial communication circuit 114 to the master controller 11 by serial communication via the serial communication port CN31.

Figure 3:
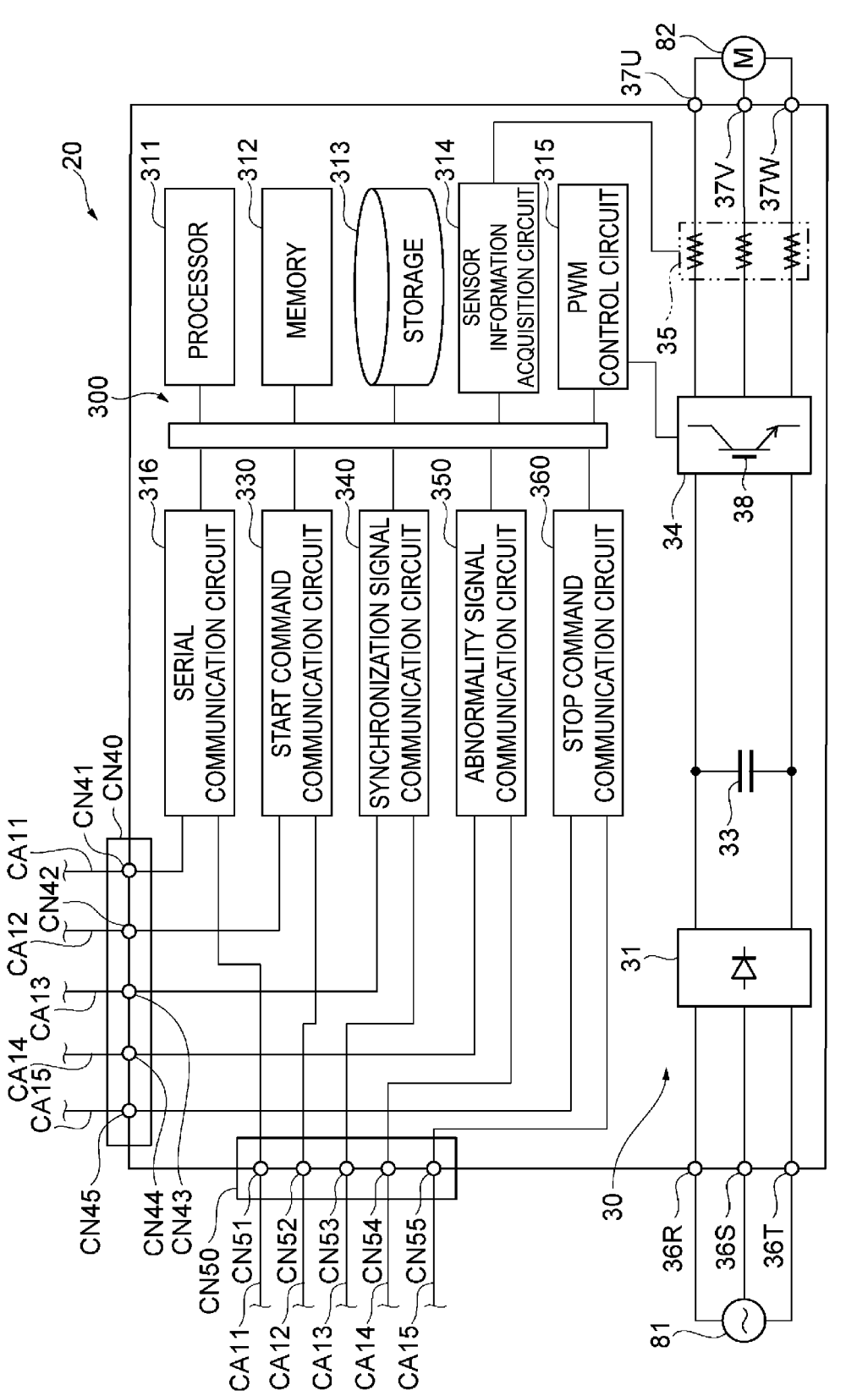
FIG. 3 is a schematic diagram illustrating a configuration of a power conversion device.

FIG. 3 is a schematic diagram illustrating the configuration of the power conversion device 20. As illustrated in FIG. 3, the power conversion device 20 includes a power conversion circuit 30 and a slave control circuit 300 in addition to the upper connector CN40 and the lower connector CN50 described above.

The upper connector CN40 includes a serial communication port CN41. The lower connector CN50 includes a serial communication port CN51. The serial communication line CA11 of the master-to-slave cable CA10 is connected to the serial communication ports CN41 and CN51. The serial communication ports CN41 and CN51 also constitute at least a part of the serial communication system CS01 or the third serial communication system CS03.

The power conversion circuit 30 converts the primary power into the secondary power by switching on and off a plurality of switching elements at a carrier frequency. The power conversion circuit 30 is, for example, a voltage source inverter, and applies a secondary voltage according to a voltage command to a load 82. For example, the power conversion circuit 30 includes power source connection terminals 36R, 36S, and 36T, load connection terminals 37U, 37V, and 37W, a rectifier circuit 31, a smoothing capacitor 33, an inverter circuit 34, and a current sensor 35.

The power source connection terminals 36R, 36S, and 36T are respectively connected to three phases (for example, an R-phase, an S-phase, and a T-phase) of a power source 81 that supplies primary power. The load connection terminals 37U, 37V, and 37W are respectively connected to three phases (for example, a U-phase, a V-phase, and a W-phase) of the load 82 driven by the secondary power.

The rectifier circuit 31 is, for example, a diode bridge circuit or a PWM converter circuit, and converts the primary power input to the power source connection terminals 36R, 36S, and 36T into direct current power. The smoothing capacitor 33 smooths the direct current power.

The inverter circuit 34 converts the direct current power into the secondary power and outputs the secondary power to the load connection terminals 37U, 37V, and 37W. For example, the inverter circuit 34 includes a plurality of switching elements 38, and performs the power conversion by switching on and off the plurality of switching elements 38. The switching element 38 is, for example, a power metal oxide semiconductor field effect transistor (MOSFET), an insulated gate bipolar transistor (IGBT), or the like, and is switched on and off in accordance with a gate drive signal.

The current sensor 35 detects a current flowing between the inverter circuit 34 and the load connection terminals 37U, 37V, and 37W. For example, the current sensor 35 may be configured to detect the currents of all the phases (U-phase, V-phase, and W-phase) of a three-phase alternating current or may be configured to detect the currents of any two phases of a three-phase alternating current. As long as no zero-phase current is generated, the sum of the currents of the U-phase, the V-phase, and the W-phase is zero, and information about the currents of all the phases is obtained, even when the currents of two phases are detected.

A specific example of the load 82 is an electric motor (for example, a three-phase alternating current electric motor). The power conversion circuits 30 of the plurality of power conversion devices 20 may be connected in parallel to the same load 82. The power conversion circuits 30 of the plurality of power conversion devices 20 may be connected to a plurality of the loads 82, respectively.

The slave control circuit 300 controls the power conversion circuit 30 to perform power conversion from the primary power to the secondary power based on the control command. The slave control circuit 300 includes a processor 311, a memory 312, a storage 313, a sensor information acquisition circuit 314, a PWM control circuit 315, and a serial communication circuit 316.

The sensor information acquisition circuit 314 acquires a current detection result by the current sensor 35. The PWM control circuit 315 controls the power conversion circuit 30 to perform power conversion from the primary power to the secondary power based on the control command. For example, the PWM control circuit 315 switches on and off the plurality of switching elements 38 of the inverter circuit 34 in a cycle of a carrier wave, and changes the ratio of the on-period of the switching elements 38 in a carrier cycle (cycle of the carrier wave), thereby adjusting the secondary power. For example, the PWM control circuit 315 switches on and off the switching element 38 in the cycle of the carrier wave to generate a secondary voltage according to a voltage command (an example of the control command).

The serial communication circuit 316 is connected to the serial communication port CN41 of the upper connector CN40 and the serial communication port CN51 of the lower connector CN50. In the power conversion device 20 connected to the master controller 11, the serial communication circuit 316 is connected to the serial communication system CS01 via the serial communication ports CN41 and CN51, and performs serial communication with the master controller 11 and the lower power conversion device 20 via the serial communication system CS01.

In the power conversion device 20 connected to the master controller 11 via the upper power conversion device 20, the serial communication circuit 316 is connected to the serial communication system CS01 via the serial communication ports CN41 and CN51, and performs serial communication with the upper power conversion device 20 and the lower power conversion device 20 via the serial communication system CS01.

In the power conversion device 20 connected to the master controller 12, the serial communication circuit 316 is connected to the third serial communication system CS03 via the serial communication ports CN41 and CN51, and performs serial communication with the master controller 12 and the lower power conversion device 20 via the third serial communication system CS03.

In the power conversion device 20 connected to the master controller 12 via the upper power conversion device 20, the serial communication circuit 316 is connected to the third serial communication system CS03 via the serial communication ports CN41 and CN51, and performs serial communication with the upper power conversion device 20 and the lower power conversion device 20 via the third serial communication system CS03.

The storage 313 includes one or more computer-readable storage media such as a nonvolatile semiconductor memory or a hard disk drive. The storage 313 stores a program for causing the slave control circuit 300 to control the power conversion circuit 30 by the PWM control circuit 315 to perform power conversion from the primary power to the secondary power, based on the control command received by the serial communication circuit 316 from the master controller 10 by serial communication via the serial communication port CN41.

The program stored in the storage 313 may be configured to cause the slave control circuit 300 to further execute acquiring a feedback signal indicating a state of the power conversion circuit 30 and transmitting the feedback signal from the serial communication circuit 316 to the master controller 10 by serial communication via the serial communication port CN41.

The memory 312 includes one or more computer-readable temporary storage media such as a random access memory (RAM). The memory 312 temporarily stores a program loaded from the storage 313, a calculation result by the processor 311, and the like.

The processor 311 includes one or more arithmetic processing devices and executes the program in cooperation with the memory 312. As a result, the processor 311 causes the PWM control circuit 315 to control the power conversion circuit 30 to perform power conversion from the primary power to the secondary power based on the control command received by the serial communication circuit 316 by serial communication via the serial communication port CN41.

The processor 311 may acquire the feedback signal indicating the state of the power conversion circuit 30, and transmit the feedback signal from the serial communication circuit 316 to the master controller 10 by serial communication via the serial communication port CN41. For example, the processor 311 may cause the sensor information acquisition circuit 314 to acquire the current detection result by the current sensor 35 as an example of the feedback signal indicating the state of the power conversion circuit 30, and may cause the serial communication circuit 316 to transmit the current detection result to the master controller 10 by serial communication via the serial communication port CN41.

Figure 4:
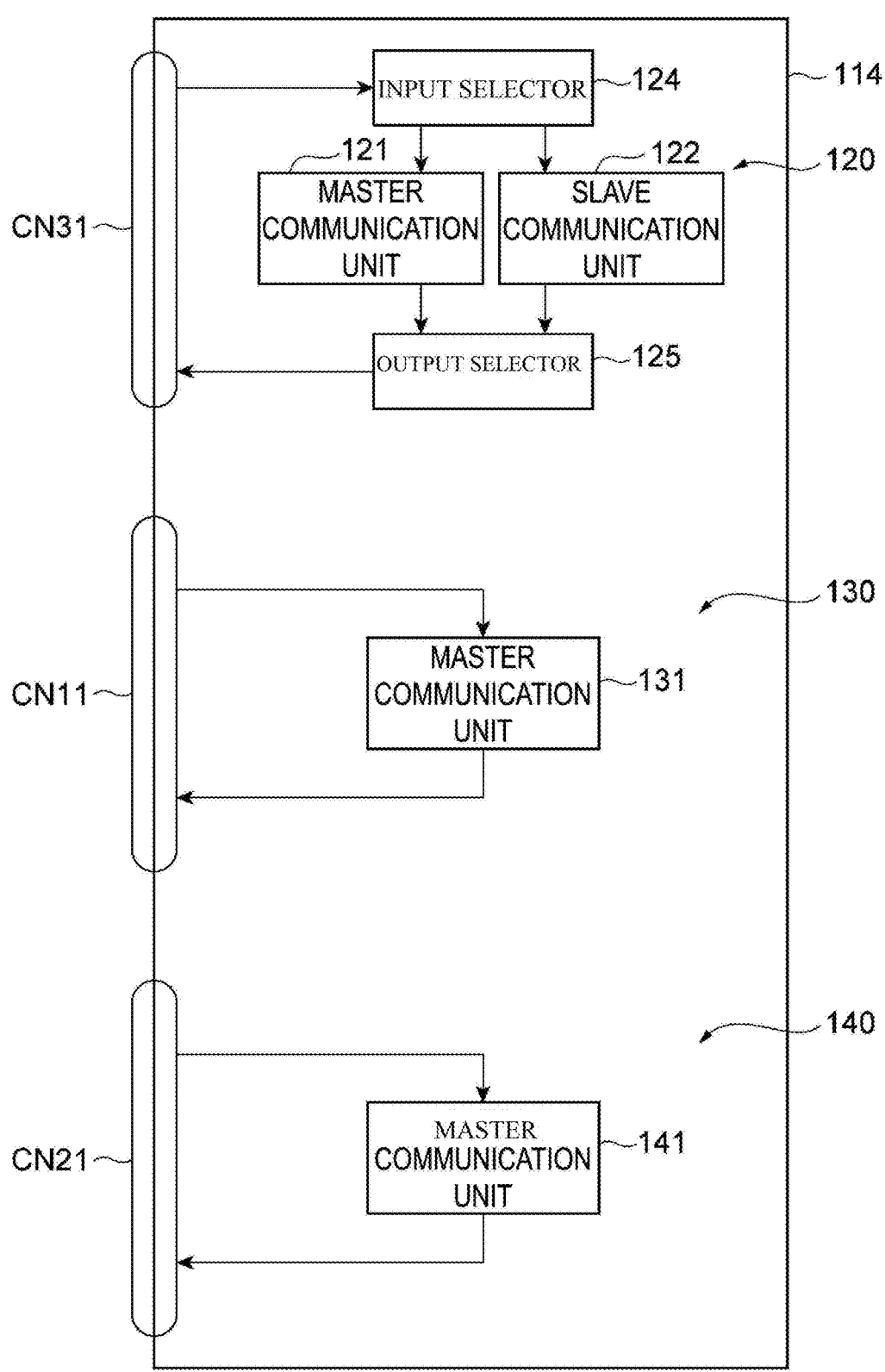
FIG. 4 is a block diagram illustrating a functional configuration of a serial communication circuit.

FIG. 4 is a block diagram illustrating a functional configuration of the serial communication circuit 114 of the master controller 10. The serial communication circuit 114 includes three communication modules 120, 130, 140. The communication module 120 performs serial communication with another master controller 10 via the serial communication port CN31, the communication module 130 performs serial communication with the power conversion device 20 via the serial communication port CN11, and the communication module 140 performs serial communication with the power conversion device 20 via the serial communication port CN21.

The communication module 120 includes a master communication unit 121, a slave communication unit 122, an input selector 124, and an output selector 125. The master communication unit 121 transmits the control command to another master controller 12 via the serial communication port CN31, and receives the feedback signal from another master controller 12 via the serial communication port CN31. The slave communication unit 122 receives the control command from another master controller 11 via the serial communication port CN31 and transmits the feedback signal to another master controller 11 via the serial communication port CN31.

Figure 6:
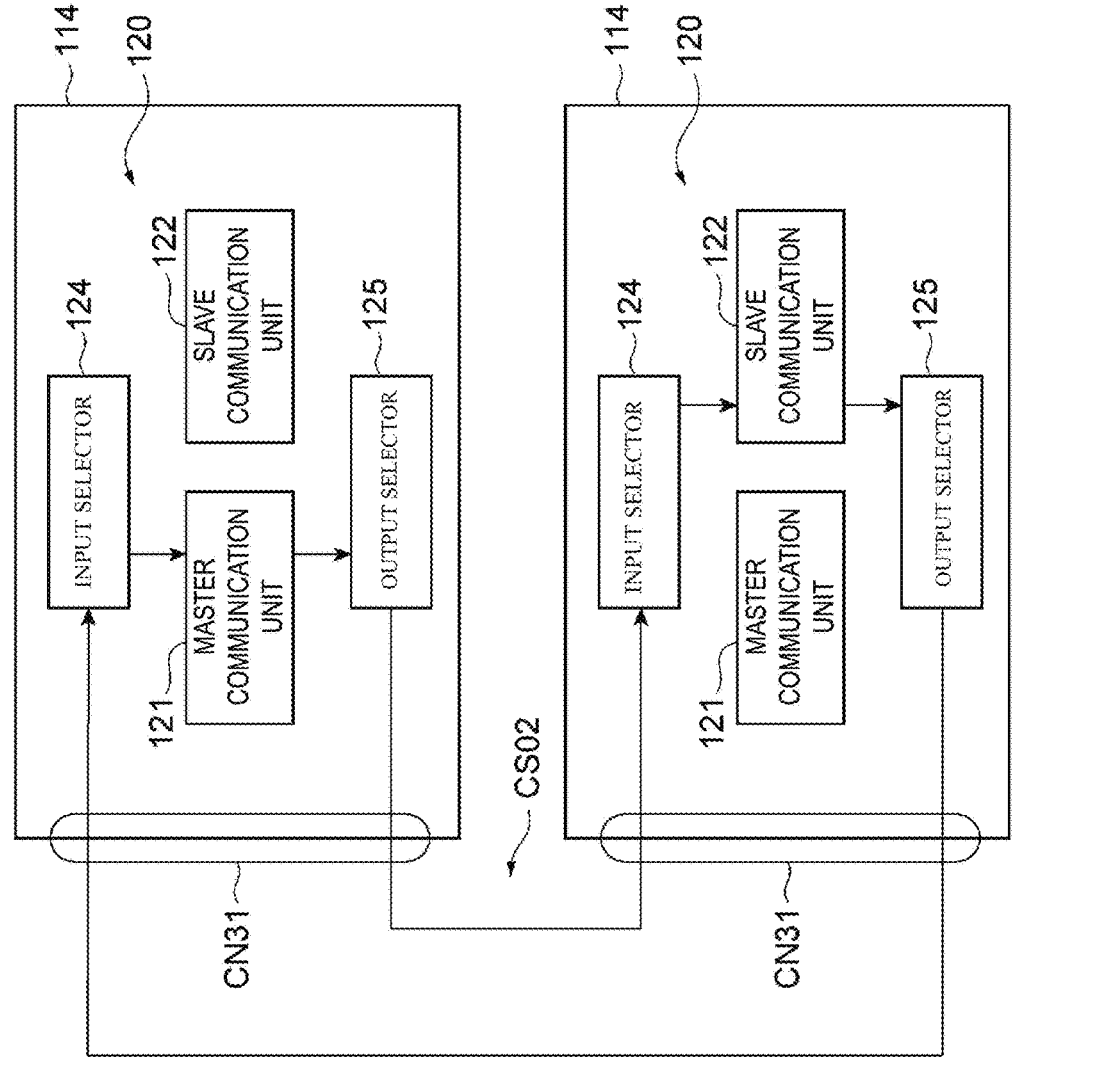
FIG. 6 is a block diagram illustrating a flow of information by master-to-master serial communication.

In the primary mode, the input selector 124 inputs the feedback signal from the serial communication port CN31 to the master communication unit 121, and inputs the control command from the serial communication port CN31 to the slave communication unit 122 in the secondary mode (see FIG. 6). In the primary mode, the output selector 125 outputs the control command from the master communication unit 121 to the serial communication port CN31, and outputs the feedback signal from the slave communication unit 122 to the serial communication port CN31 in the secondary mode.

The communication module 130 includes a master communication unit 131. The master communication unit 131 transmits the control command to the power conversion device 20 via the serial communication port CN11, and receives the feedback signal from the power conversion device 20 via the serial communication port CN11. The communication module 140 includes a master communication unit 141. The master communication unit 141 transmits the control command to the power conversion device 20 via the serial communication port CN21, and receives the feedback signal from the power conversion device 20 via the serial communication port CN21.

Figure 5:
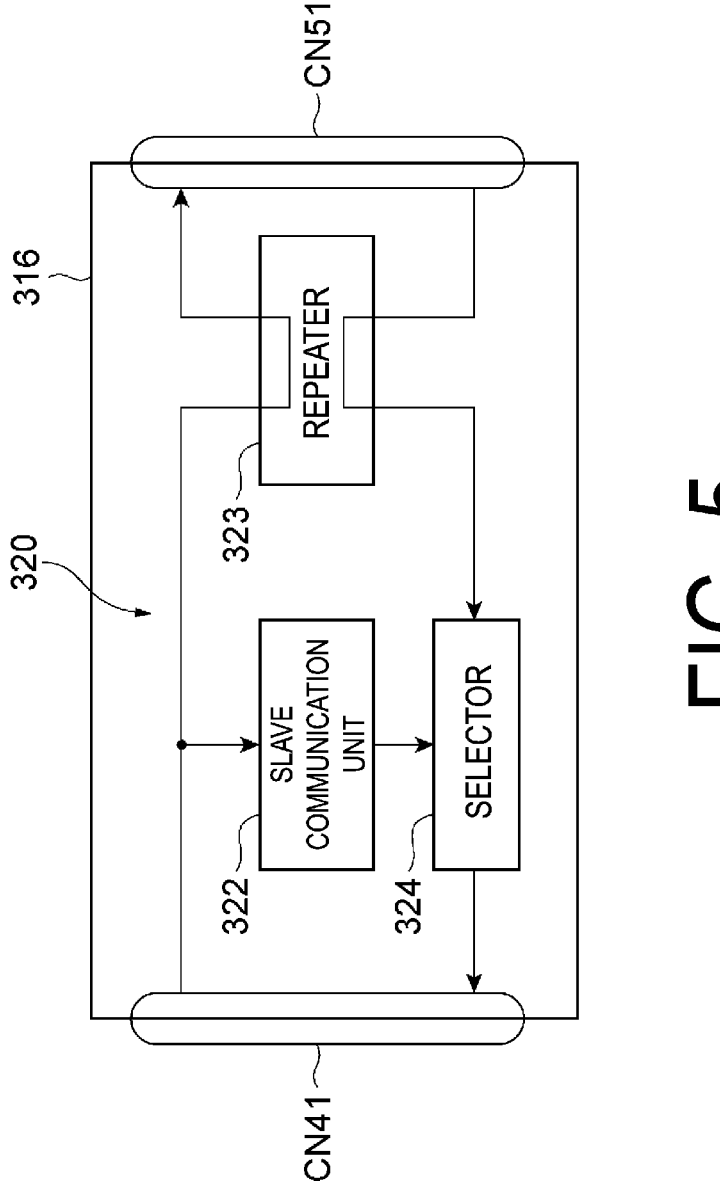
FIG. 5 is a block diagram illustrating the functional configuration of the serial communication circuit.
Figure 7:
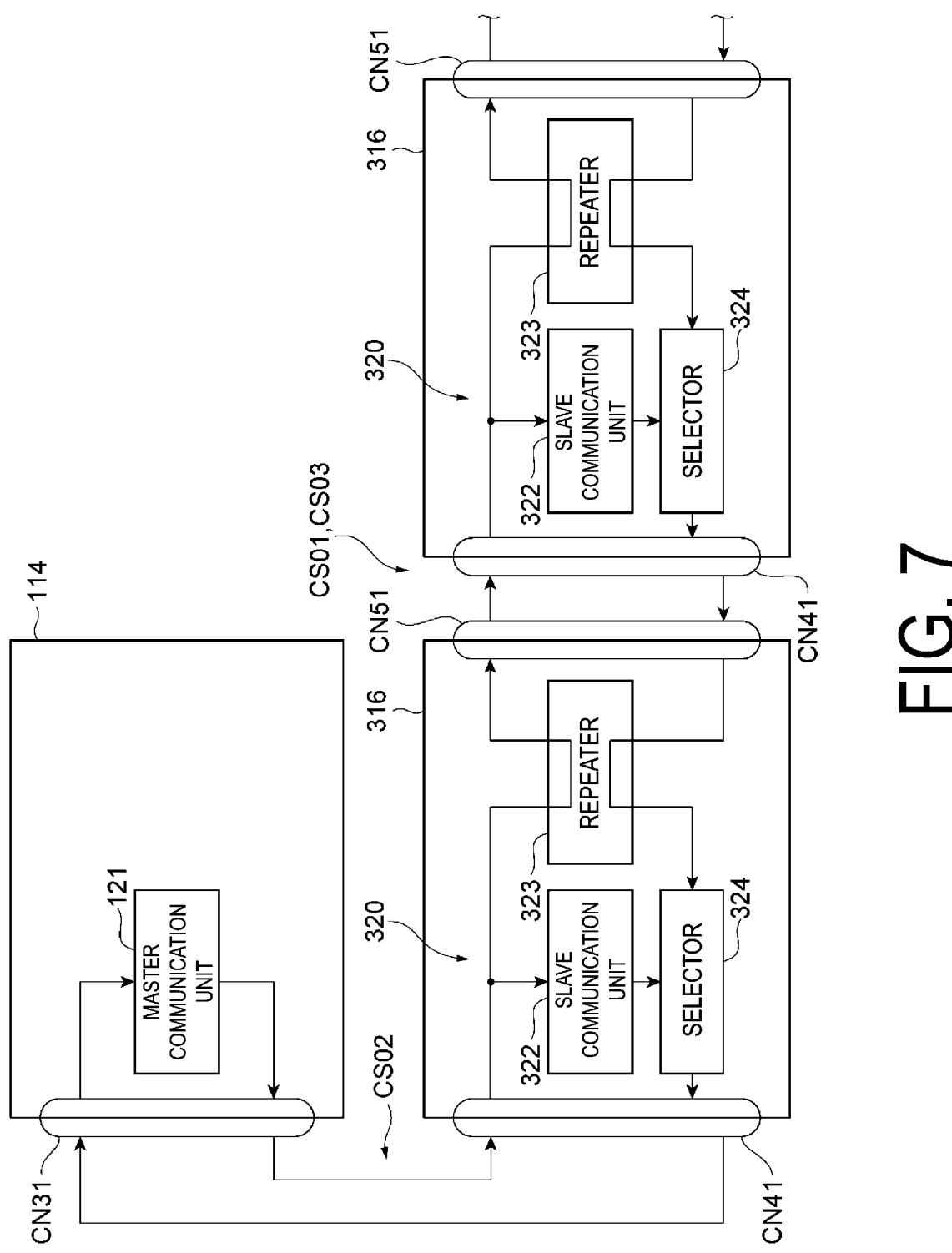
FIG. 7 is a block diagram illustrating a flow of information by master-to-slave serial communication.

FIG. 5 is a block diagram illustrating a functional configuration of the serial communication circuit 316 of the power conversion device 20. The serial communication circuit 316 includes one communication module 320. The communication module 320 includes a slave communication unit 322, a repeater 323, and a selector 324. The slave communication unit 322 receives the control command from the master controller 10 or the upper power conversion device 20 via the serial communication port CN41, and transmits the feedback signal to the master controller 10 or the upper power conversion device 20 via the serial communication port CN41 (see FIG. 7).

The repeater 323 transmits the control command received by the slave communication unit 322 to the lower power conversion device 20 via the serial communication port CN51. The repeater 323 receives the feedback signal from the lower power conversion device 20 via the serial communication port CN51, and transmits the received feedback signal to the master controller 10 or the upper power conversion device 20 via the serial communication port CN41.

When the slave communication unit 322 transmits the feedback signal to the master controller 10 or the upper power conversion device 20, the selector 324 causes the repeater 323 to wait for the transmission of the feedback signal to the master controller 10 or the upper power conversion device 20. Further, when the repeater 323 transmits the feedback signal to the master controller 10 or the upper power conversion device 20, the selector 324 causes the slave communication unit 322 to wait for the transmission of the feedback signal to the master controller 10 or the upper power conversion device 20.

Referring back to FIG. 1, the master controller 10 may be capable of communicating with the plurality of power conversion devices 20 also by a start command system different from the serial communication system CS01. Each of the plurality of power conversion devices 20 may transmit a reception notification of the control command to the master controller 10 by serial communication via the serial communication system CS01 when receiving the control command, the master controller 10 may transmit the start command to each of the plurality of power conversion devices 20 by the start command system when receiving the reception notifications of the control commands from all of the plurality of power conversion devices 20, and each of the plurality of power conversion devices 20 may start power conversion based on the received control command when receiving the start command.

For example, the power conversion device 21C transmits an own device reception notification of the control command to the power conversion device 21B by serial communication via the serial communication system CS01. The power conversion device 21B transmits an own device reception notification of the control command and the reception notification received from the power conversion device 21C to the power conversion device 21A by serial communication via the serial communication system CS01. The power conversion device 21A transmits an own device reception notification of the control command and the reception notification received from the power conversion device 21B to the master controller 10 by serial communication via the serial communication system CS01. Thus, the reception notifications from the power conversion devices 21A, 21B, and 21C are received by the master controller 10 via the master-to-slave connector CN10.

The power conversion device 21F transmits an own device reception notification of the control command to the power conversion device 21E by serial communication via the serial communication system CS01. The power conversion device 21E transmits an own device reception notification of the control command and the reception notification received from the power conversion device 21F to the power conversion device 21D by serial communication via the serial communication system CS01. The power conversion device 21D transmits an own device reception notification of the control command and the reception notification received from the power conversion device 21E to the master controller 10 by serial communication via the serial communication system CS01. Thus, the reception notifications from the power conversion devices 21D, 21E, and 21F are received by the master controller 10 via the master-to-slave connector CN20.

When the master controller 10 receives the reception notifications of the control commands from all of the power conversion devices 21A, 21B, 21C, 21D, 21E, and 21F, the master controller 10 transmits the start command to each of the power conversion devices 21A, 21B, 21C, 21D, 21E, and 21F by the start command system. When receiving the start command, each of the power conversion devices 21A, 21B, 21C, 21D, 21E, and 21F starts power conversion based on the received control command (the control command that is the target of the reception notification).

When the power conversion system 1 includes the master controllers 11 and 12, the master controller 12 may be capable of communicating with the master controller 11 also by a second start command system different from the second serial communication system CS02. Further, the master controller 12 may be capable of communicating with the plurality of power conversion devices 20 of the second group also by a third start command system different from the third serial communication system CS03.

Each of the plurality of power conversion devices 20 of the second group may transmit the reception notification of the control command to the master controller 12 by serial communication via the third serial communication system CS03 when receiving the control command, and the master controller 12 may transmit the reception notification of the control command to the master controller 11 by serial communication via the second serial communication system CS02 when receiving the reception notifications of the control commands from all of the plurality of power conversion devices 20 of the second group.

The master controller 11 may transmit the start command to each of the plurality of power conversion devices 20 by the start command system and transmit the start command to each of the plurality of power conversion devices 20 of the second group by the second start command system and the third start command system, when receiving the reception notifications of the control commands from all of the plurality of power conversion devices 20 by serial communication via the serial communication system CS01 and receiving the reception notification of the control command from the master controller 12 by serial communication via the second serial communication system CS02.

For example, the power conversion device 22C transmits an own device reception notification of the control command to the power conversion device 22B by serial communication via the third serial communication system CS03. The power conversion device 22B transmits an own device reception notification of the control command and the reception notification received from the power conversion device 22C to the power conversion device 22A by serial communication via the third serial communication system CS03. The power conversion device 22A transmits an own device reception notification of the control command and the reception notification received from the power conversion device 22B to the master controller 12 by serial communication via the third serial communication system CS03. Thus, the reception notifications from the power conversion devices 22A, 22B, and 22C are received by the master controller 12 via the master-to-slave connector CN10.

The power conversion device 22F transmits an own device reception notification of the control command to the power conversion device 22E by serial communication via the third serial communication system CS03. The power conversion device 22E transmits an own device reception notification of the control command and the reception notification received from the power conversion device 22F to the power conversion device 22D by serial communication via the third serial communication system CS03. The power conversion device 22D transmits an own device reception notification of the control command and the reception notification received from the power conversion device 22E to the master controller 12 by serial communication via the third serial communication system CS03. Thus, the reception notifications from the power conversion devices 22D, 22E, and 22F are received by the master controller 12 via the master-to-slave connector CN20.

When receiving the reception notifications of the control commands from all of the power conversion devices 22A, 22B, 22C, 22D, 22E, and 22F, the master controller 12 transmits the reception notification of the control command to the master controller 11 by serial communication via the second serial communication system CS02.

The master controller 11 transmits the start command to each of the power conversion devices 21A, 21B, 21C, 21D, 21E, and 21F by the start command system, and transmits the start command to each of the power conversion devices 22A, 22B, 22C, 22D, 22E, and 22F by the second start command system and the third start command system, when receiving the reception notifications of the control commands from all of the power conversion devices 21A, 21B, 21C, 21D, 21E, and 21F by serial communication via the serial communication system CS01 and receiving the reception notification of the control command from the master controller 12 by serial communication via the second serial communication system CS02. When receiving the start command, each of the power conversion devices 21A, 21B, 21C, 21D, 21E, 21F, 22A, 22B, 22C, 22D, 22E, and 22F starts power conversion based on the received control command (the control command that is the target of the reception notification).

The start command system, the second start command system, and the third start command system may each be a wired system or a wireless system. For example, the wired start command system is constituted by another communication line independent of the communication line constituting the serial communication system. The wireless start command system is constituted by a transceiver for a wireless signal in a frequency band different from the frequency band of the serial communication system.

For example, as illustrated in FIG. 2, the master-to-slave connector CN10 may further include a start command port CN12 independent of the serial communication port CN11. The master-to-slave connector CN20 may further include a start command port CN22 independent of the serial communication port CN21.

The master-to-slave cable CA10 may include a start command line CA12 connected to the start command ports CN12 and CN22 independently of the serial communication line CA11. The start command ports CN12, CN22 and the start command line CA12 constitute at least a part of a start command system CS11 or a third start command system CS13 (see FIG. 8).

The master-to-master connector CN30 may further include a start command port CN32 independent of the serial communication port CN31. The master-to-master cable CA20 may include a start command line CA22 connected to the start command port CN32 independently of the serial communication line CA21. The start command port CN32 and the start command line CA22 constitute at least a part of a second start command system CS12 (see FIG. 8).

The master control circuit 100 may further include a start command communication circuit 150. The start command communication circuit 150 is connected to the start command port CN12 of the master-to-slave connector CN10, the start command port CN22 of the master-to-slave connector CN20, and the start command port CN32 of the master-to-master connector CN30. The start command ports CN12, CN22, and CN32 are connected to each other in the start command communication circuit 150.

In the master controller 11 in the primary mode, the start command communication circuit 150 is connected to the start command system CST 1 via the start command ports CN12 and CN22, and transmits the start command to the plurality of power conversion devices 20 by the start command system CS11. Further, the start command communication circuit 150 is connected to the second start command system CS12 via the start command port CN32, and transmits the start command to the plurality of power conversion devices 20 of the second group by the second start command system CS12 and the third start command system CS13.

In this case, the program stored in the storage 113 may be configured to further cause the master control circuit 100 to transmit the start command from the start command communication circuit 150 to each of the plurality of power conversion devices 20 by communication via the start command ports CN12 and CN22 when the serial communication circuit 114 receives the reception notifications of the control commands from all of the plurality of power conversion devices 20 by serial communication via the serial communication ports CN11 and CN21.

As described above, the program stored in the storage 113 may be configured to further cause the master control circuit 100 to switch the operation mode between the primary mode and the secondary mode. The program in this case may be configured to further cause the master control circuit 100 to, in the primary mode, transmit the start command from the start command communication circuit 150 to each of the plurality of power conversion devices 20 by communication via the start command ports CN12 and CN22 and to transmit the start command to the master controller 12 by communication via the start command port CN32, when the serial communication circuit 114 receives the reception notifications of the control commands from all of the plurality of power conversion devices 20 by serial communication via the serial communication ports CN11 and CN21 and the serial communication circuit 114 receives the control command reception notification from the master controller 12 by serial communication via the serial communication port CN31.

Further, the program in this case may be configured to further cause the master control circuit 100 to, in the secondary mode, transmit the reception notification of the control command from the serial communication circuit 114 to the master controller 11 by serial communication via the serial communication port CN31 when the serial communication circuit 114 receives the reception notifications of the control commands from all of the plurality of power conversion devices 20 of the second group by serial communication via the serial communication ports CN11 and CN21.

By executing the program stored in the storage 113, the processor 111 may cause the start command communication circuit 150 to transmit the start command to each of the plurality of power conversion devices 20 by communication via the start command ports CN12 and CN22 when the serial communication circuit 114 receives the reception notifications of the control commands from all of the plurality of power conversion devices 20 by serial communication via the serial communication ports CN11 and CN21.

In the primary mode, the processor 111 may cause the start command communication circuit 150 to transmit the start command to each of the plurality of power conversion devices 20 by communication via the start command ports CN12 and CN22, and cause the start command communication circuit 150 to transmit the start command to the master controller 12 by communication via the start command port CN32, when the serial communication circuit 114 receives the reception notifications of the control commands from all of the plurality of power conversion devices 20 by serial communication via the serial communication ports CN11 and CN21 and the serial communication circuit 114 receives the reception notification of the control command from the master controller 12 by serial communication via the serial communication port CN31.

As described above, the start command ports CN12, CN22, and CN32 are connected to each other in the start command communication circuit 150. Therefore, the start command transmitted to the master controller 12 by communication via the start command port CN32 is transmitted from the start command communication circuit 150 of the master controller 12 to each of the plurality of power conversion devices 20 of the second group by communication via the start command ports CN12 and CN22 of the master controller 12.

In the secondary mode, the processor 111 may cause the serial communication circuit 114 to transmit the reception notification of the control command to the master controller 11 by serial communication via the serial communication port CN31 when the serial communication circuit 114 receives the reception notifications of the control commands from all of the plurality of power conversion devices 20 of the second group by serial communication via the serial communication ports CN11 and CN21.

As illustrated in FIG. 3, the upper connector CN40 may further include a start command port CN42 independent of the serial communication port CN41. The lower connector CN50 may further include a start command port CN52 independent of the serial communication port CN51. The start command line CA12 of the master-to-slave cable CA10 is connected to the start command ports CN42 and CN52. The start command ports CN42 and CN52 also constitute at least a part of the start command system CS11 or the third start command system CS13 (see FIG. 8).

The slave control circuit 300 may further include a start command communication circuit 330. The start command communication circuit 330 is connected to the start command port CN42 of the upper connector CN40 and the start command port CN52 of the lower connector CN50. The start command ports CN42 and CN52 are connected to each other in the start command communication circuit 330.

In the power conversion device 20 connected to the master controller 11, the start command communication circuit 330 is connected to the start command system CS11 via the start command ports CN42 and CN52, and communicates with the master controller 11 and the lower power conversion device 20 via the start command system CS11. In the power conversion device 20 connected to the master controller 11 via the upper power conversion device 20, the start command communication circuit 330 is connected to the start command system CS11 via the start command ports CN42 and CN52, and communicates with the upper power conversion device 20 and the lower power conversion device 20 via the start command system CS11.

In the power conversion device 20 connected to the master controller 12, the start command communication circuit 330 is connected to the third start command system CS13 via the start command ports CN42 and CN52, and communicates with the master controller 12 and the lower power conversion device 20 via the third start command system CS13. In the power conversion device 20 connected to the master controller 12 via the upper power conversion device 20, the start command communication circuit 330 is connected to the third start command system CS13 via the start command ports CN42 and CN52, and communicates with the upper power conversion device 20 and the lower power conversion device 20 via the third start command system CS13.

In this case, the program stored in the storage 313 may be configured to further cause the slave control circuit 300 to transmit the reception notification of the control command from the serial communication circuit 316 to the master controller 10 by serial communication via the serial communication port CN41 when the serial communication circuit 316 receives the control command by serial communication via the serial communication port CN41, and to cause the PWM control circuit 315 to start power conversion based on the received control command when the start command communication circuit 330 receives the start command by communication via the start command port CN42.

By executing the program stored in the storage 313, the processor 311 may cause the serial communication circuit 316 to transmit the control command reception notification to the master controller 10 by serial communication via the serial communication port CN41 when the serial communication circuit 316 receives the control command by serial communication via the serial communication port CN41, and cause the PWM control circuit 315 to start power conversion by the power conversion circuit 30 based on the received control command when the start command communication circuit 330 receives the start command by communication via the start command port CN42.

Figure 8:
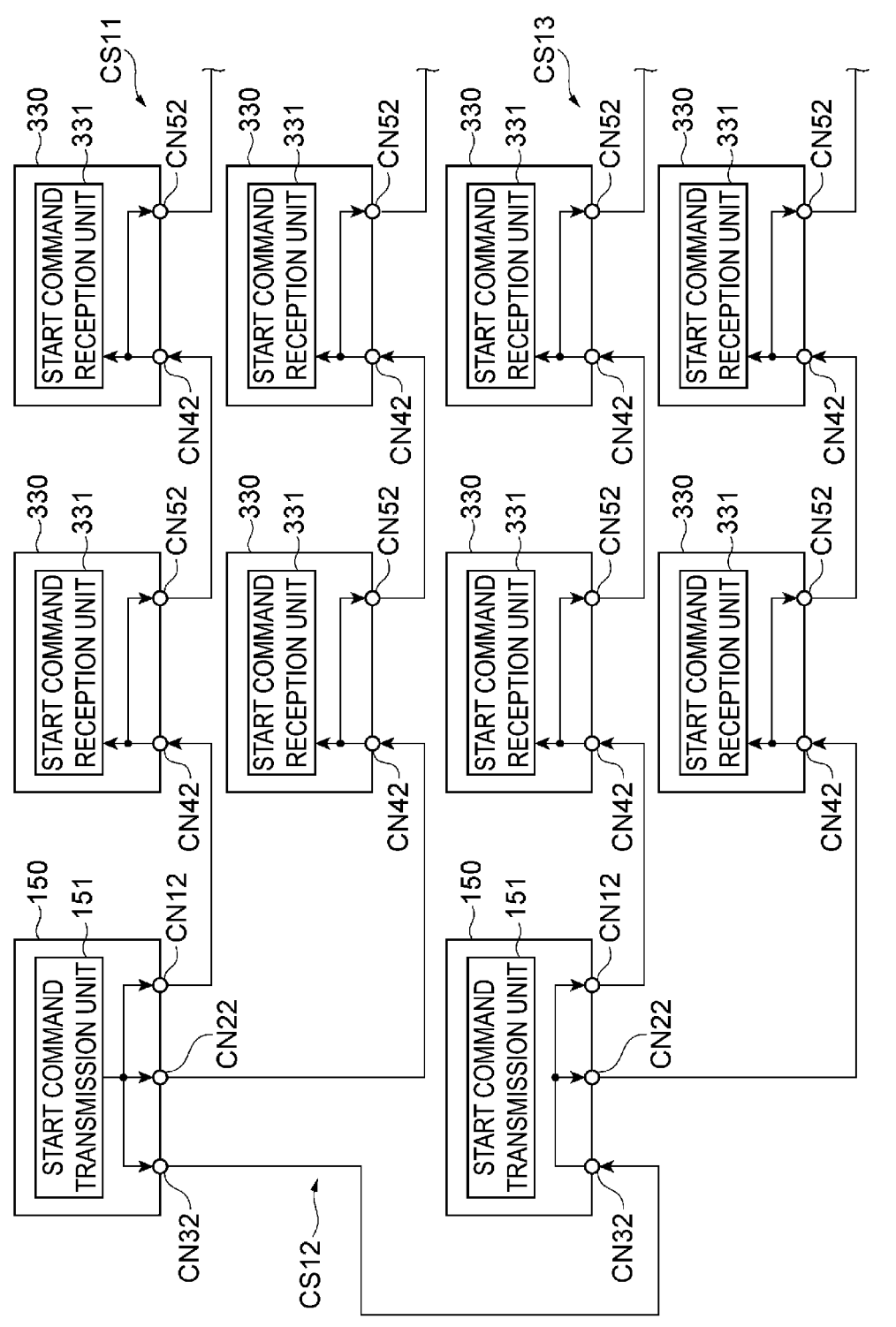
FIG. 8 is a block diagram illustrating a functional configuration of a start command communication circuit.

FIG. 8 is a block diagram illustrating a functional configuration of the start command communication circuit 150 of the master control circuit 100 and the start command communication circuit 330 of the slave control circuit 300. As illustrated in FIG. 8, the start command communication circuit 150 includes a start command transmission unit 151, and the start command communication circuit 330 includes a start command reception unit 331.

The start command transmission unit 151 of the master controller 11 transmits the start command to the master controller 12 via the start command port CN32, and transmits the start command to the plurality of power conversion devices 20 via the start command ports CN12 and CN22. As described above, the start command ports CN12, CN22, and CN32 are connected to each other in the start command communication circuit 150. Therefore, the start command transmitted to the master controller 12 via the start command port CN32 is transmitted to the plurality of power conversion devices 20 of the second group via the start command ports CN12 and CN22 of the master controller 12.

The start command reception unit 331 receives the start command from the master controller 10 or the upper power conversion device 20 via the start command port CN42. As described above, the start command ports CN42 and CN52 are connected to each other in the start command communication circuit 330. Therefore, the start command received by the start command reception unit 331 is further transmitted to the lower power conversion device 20 via the start command port CN52.

The plurality of power conversion devices 20 may be communicatively connected in parallel to the master controller 10 by the start command system CS11 or the third start command system CS13. A parallel communication connection means a connection in which the output of the master controller 10 is directly input to each of the plurality of power conversion devices 20. By the parallel communication connection by the start command system CS11, the plurality of power conversion devices 20 receive, in parallel, the start command from the master controller 10.

Returning to FIG. 1, the master controller 10 may be capable of communicating with the plurality of power conversion devices 20 also by an abnormality notification system different from the serial communication system CS01, and may be capable of communicating with the plurality of power conversion devices 20 also by a stop command system different from the serial communication system CS01 and the abnormality notification system. Each of the plurality of power conversion devices 20 may transmit an abnormality confirmation result to the master controller 10 by the abnormality notification system, the master controller 10 may transmit the stop command to the plurality of power conversion devices 20 by the stop command system when there is an abnormality in any of the plurality of power conversion devices 20, and each of the plurality of power conversion devices 20 may stop the output of the secondary power when receiving the stop command.

For example, the power conversion device 21C transmits an own device abnormality confirmation result to the power conversion device 21B by the abnormality notification system. The power conversion device 21B transmits an own device abnormality confirmation result and the abnormality confirmation result received from the power conversion device 21C to the power conversion device 21A by the abnormality notification system. The power conversion device 21A transmits an own device abnormality confirmation result and the abnormality confirmation result received from the power conversion device 21B to the master controller 10 by the abnormality notification system. Thus, the abnormality confirmation results from the power conversion devices 21A, 21B, and 21C are received by the master controller 10 via the master-to-slave connector CN10. Specific examples of the abnormality confirmation result of each own device include a confirmation result of the presence or absence of an overcurrent, a confirmation result of the presence or absence of various alarms, and the like.

The power conversion device 21F transmits an own device abnormality confirmation result to the power conversion device 21E by the abnormality notification system. The power conversion device 21E transmits an own device abnormality confirmation result and the abnormality confirmation result received from the power conversion device 21F to the power conversion device 21D by the abnormality notification system. The power conversion device 21D transmits an own device abnormality confirmation result and the abnormality confirmation result received from the power conversion device 21E to the master controller 10 by the abnormality notification system. Thus, the abnormality confirmation results from the power conversion devices 21D, 21E, and 21F are received by the master controller 10 via the master-to-slave connector CN20.

When there is an abnormality in any of the power conversion devices 21A, 21B, 21C, 21D, 21E, and 21F, the master controller 10 transmits the stop command to each of the power conversion devices 21A, 21B, 21C, 21D, 21E, and 21F by the stop command system. Each of the power conversion devices 21A, 21B, 21C, 21D, 21E, and 21F stops the output of the secondary power when receiving the stop command.

When the power conversion system 1 includes the master controllers 11 and 12, the master controller 12 may be capable of communicating with the master controller 11 also by a second abnormality notification system different from the second serial communication system CS02, and may be capable of communicating with the master controller 11 also by a second stop command system different from the second serial communication system CS02 and the second abnormality notification system.

Further, the master controller 12 may be capable of communicating with the plurality of power conversion devices 20 of the second group also by a third abnormality notification system different from the third serial communication system CS03, and may be capable of communicating with the plurality of power conversion devices 20 of the second group also by a third stop command system different from the third serial communication system CS03 and the third abnormality notification system.

Each of the plurality of power conversion devices 20 of the second group may transmit the abnormality confirmation result to the master controller 12 by the third abnormality notification system. Hereinafter, the abnormality confirmation results transmitted to the master controller 12 by the plurality of power conversion devices 20 of the second group are referred to as "abnormality confirmation results of the second group". The master controller 12 may transmit the abnormality confirmation results of the second group received by the third abnormality notification system to the master controller 11 by the second abnormality notification system.

When there is an abnormality in any of the plurality of power conversion devices 20 and the plurality of power conversion devices 20 of the second group, the master controller 11 may transmit the stop command to each of the plurality of power conversion devices 20 by the stop command system, and may transmit the stop command to each of the plurality of power conversion devices 20 of the second group by the second stop command system and the third stop command system. The plurality of power conversion devices 20 and each of the plurality of power conversion devices 20 of the second group may stop the output of the secondary power when receiving the stop command.

For example, the power conversion device 22C transmits an own device abnormality confirmation result to the power conversion device 22B by the third abnormality notification system. The power conversion device 22B transmits an own device abnormality confirmation result and the abnormality confirmation result received from the power conversion device 22C to the power conversion device 22A by the third abnormality notification system. The power conversion device 22A transmits an own device abnormality confirmation result and the abnormality confirmation result received from the power conversion device 22B to the master controller 12 by the third abnormality notification system. Thus, the abnormality confirmation results from the power conversion devices 22A, 22B, and 22C are received by the master controller 12 via the master-to-slave connector CN10.

The power conversion device 22F transmits an own device abnormality confirmation result to the power conversion device 22E by the third abnormality notification system. The power conversion device 22E transmits an own device abnormality confirmation result and the abnormality confirmation result received from the power conversion device 22F to the power conversion device 22D by the third abnormality notification system. The power conversion device 22D transmits an own device abnormality confirmation result and the abnormality confirmation result received from the power conversion device 22E to the master controller 12 by the third abnormality notification system. Thus, the abnormality confirmation results from the power conversion devices 22D, 22E, and 22F are received by the master controller 12 via the master-to-slave connector CN20. The master controller 12 transmits the abnormality confirmation results of the second group received from the power conversion devices 22A, 22B, 22C, 22D, 22E, and 22F by the third abnormality notification system to the master controller 11 by the second abnormality notification system.

When there is an abnormality in any of the power conversion devices 21A, 21B, 21C, 21D, 21E, 21F, 22A, 22B, 22C, 22D, 22E, and 22F, the master controller 11 may transmit the stop command to each of the power conversion devices 21A, 21B, 21C, 21D, 21E, and 21F by the stop command system, and may transmit the stop command to each of the power conversion devices 22A, 22B, 22C, 22D, 22E, and 22F by the second stop command system and the third stop command system. When receiving the stop command, each of the power conversion devices 21A, 21B, 21C, 21D, 21E, 21F, 22A, 22B, 22C, 22D, 22E, and 22F stops the output of the secondary power.

The abnormality notification system, the second abnormality notification system, and the third abnormality notification system may each be a wired system or a wireless system. For example, the wired abnormality notification system is constituted by another communication line independent of the communication line constituting the serial communication system. The wireless abnormality notification system is constituted by a transceiver for a wireless signal in a frequency band different from the frequency band of the serial communication system.

The stop command system, the second stop command system, and the third stop command system may each be a wired system or a wireless system. For example, the wired stop command system is constituted by another communication line independent of the communication line constituting the serial communication system and the communication line constituting the abnormality notification system. The wireless stop command system is constituted by a transceiver for a wireless signal in a frequency band different from the frequency band of the serial communication system and the frequency band of the abnormality notification system.

For example, as illustrated in FIG. 2, the master-to-slave connector CN10 may further include an abnormality signal port CN14 independent of the serial communication port CN11 and the start command port CN12. In addition, the master-to-slave connector CN10 may further include a stop command port CN15 independent of the serial communication port CN11, the start command port CN12, and the abnormality signal port CN14.

The master-to-slave connector CN20 may further include an abnormality signal port CN24 independent of the serial communication port CN21 and the start command port CN22. In addition, the master-to-slave connector CN20 may further include a stop command port CN25 independent of the serial communication port CN21, the start command port CN22, and the abnormality signal port CN24.

The master-to-slave cable CA10 may include an abnormality signal line CA14 connected to the abnormality signal ports CN14 and CN24 independently of the serial communication line CA11 and the start command line CA12. The abnormality signal ports CN14 and CN24 and the abnormality signal line CA14 constitute at least a part of an abnormality notification system CS31 or a third abnormality notification system CS33 (see FIG. 9).

In addition, the master-to-slave cable CA10 may include a stop command line CA15 connected to the stop command ports CN15 and CN25 independently of the serial communication line CA11, the start command line CA12, and the abnormality signal line CA14. The stop command ports CN15 and CN25 and the stop command line CA15 constitute at least a part of a stop command system CS41 or a third stop command system CS43 (see FIG. 10).

The master-to-master connector CN30 may further include an abnormality signal port CN34 independent of the serial communication port CN31 and the start command port CN32. In addition, the master-to-master connector CN30 may further include a stop command port CN35 independent of the serial communication port CN31, the start command port CN32, and the abnormality signal port CN34.

The master-to-master cable CA20 may include an abnormality signal line CA24 connected to the abnormality signal port CN34 independently of the serial communication line CA21 and the start command line CA22. The abnormality signal port CN34 and the abnormality signal line CA24 constitute at least a part of a second abnormality notification system CS32 (see FIG. 9).

In addition, the master-to-master cable CA20 may include a stop command line CA25 connected to the stop command port CN35 independently of the serial communication line CA21, the start command line CA22, and the abnormality signal line CA24. The stop command port CN35 and the stop command line CA25 constitute at least a part of a second stop command system CS42 (see FIG. 10).

The master control circuit 100 may further include an abnormality signal communication circuit 170 and a stop command communication circuit 180. The abnormality signal communication circuit 170 is connected to the abnormality signal port CN14 of the master-to-slave connector CN10, the abnormality signal port CN24 of the master-to-slave connector CN20, and the abnormality signal port CN34 of the master-to-master connector CN30.

In the master controller 11 in the primary mode, the abnormality signal communication circuit 170 is connected to the abnormality notification system CS31 via the abnormality signal ports CN14 and CN24, and receives abnormality confirmation results from the plurality of power conversion devices 20 by the abnormality notification system CS31. Further, the abnormality signal communication circuit 170 is connected to the second abnormality notification system CS32 via the abnormality signal port CN34, and receives the abnormality confirmation results of the second group from the master controller 12 by the second abnormality notification system CS32.

In the master controller 12 in the secondary mode, the abnormality signal communication circuit 170 is connected to the third abnormality notification system CS33 via the abnormality signal ports CN14 and CN24, and receives the abnormality confirmation results of the second group from the plurality of power conversion devices 20 of the second group by the third abnormality notification system CS33. Further, the abnormality signal communication circuit 170 is connected to the second abnormality notification system CS32 via the abnormality signal port CN34, and transmits the abnormality confirmation results of the second group to the master controller 11 by the second abnormality notification system CS32.

The stop command communication circuit 180 is connected to the stop command port CN15 of the master-to-slave connector CN10, the stop command port CN25 of the master-to-slave connector CN20, and the stop command port CN35 of the master-to-master connector CN30. The stop command ports CN15, CN25, and CN35 are connected to each other in the stop command communication circuit 180.

In the master controller 11 in the primary mode, the stop command communication circuit 180 is connected to the stop command system CS41 via the stop command ports CN15 and CN25, and transmits the stop command to the plurality of power conversion devices 20 by the stop command system CS41. The stop command communication circuit 180 is connected to the second stop command system CS42 via the stop command port CN35, and transmits a stop command to the plurality of power conversion devices 20 of the second group by the second stop command system CS42 and the third stop command system CS43.

In this case, the program stored in the storage 113 may be configured to further cause the master control circuit 100 to cause the abnormality signal communication circuit 170 to receive abnormality confirmation results from the plurality of power conversion devices 20 by communication via the abnormality signal ports CN14 and CN24, and transmit the stop command from the stop command communication circuit 180 to the plurality of power conversion devices 20 by communication via the stop command ports CN15 and CN25 when there is an abnormality in any of the plurality of power conversion devices 20.

As described above, the program stored in the storage 113 may be configured to further cause the master control circuit 100 to switch the operation mode between the primary mode and the secondary mode. The program in this case may be configured to cause the master control circuit 100 to further execute, in the primary mode, receiving the abnormality confirmation results from the plurality of power conversion devices 20 to the abnormality signal communication circuit 170 by communication via the abnormality signal ports CN14 and CN24, receiving the abnormality confirmation results of the second group from the master controller 12 by communication via the abnormality signal port CN34, transmitting the stop command from the stop command communication circuit 180 to the plurality of power conversion devices 20 by communication via the stop command ports CN15 and CN25 when there is an abnormality in any of the plurality of power conversion devices 20 and the plurality of power conversion devices 20 of the second group, and transmitting the stop command from the stop command communication circuit 180 to the master controller 12 by communication via the stop command port CN35.

The program in this case may be configured to cause the master control circuit 100 to further execute, in the secondary mode, receiving the abnormality confirmation results of the second group from the plurality of power conversion devices 20 of the second group to the abnormality signal communication circuit 170 by communication via the abnormality signal ports CN14 and CN24, and transmitting the abnormality confirmation results of the second group from the abnormality signal communication circuit 170 to the master controller 11 by communication via the abnormality signal port CN34.

By executing the program stored in the storage 113, the processor 111 may cause the abnormality signal communication circuit 170 to receive abnormality confirmation results from the plurality of power conversion devices 20 by communication via the abnormality signal ports CN14 and CN24, and may cause the stop command communication circuit 180 to transmit the stop command to the plurality of power conversion devices 20 by communication via the stop command ports CN15 and CN25 when there is an abnormality in any of the plurality of power conversion devices 20.

In the primary mode, the processor 111 may cause the abnormality signal communication circuit 170 to receive the abnormality confirmation results from the plurality of power conversion devices 20 by communication via the abnormality signal ports CN14 and CN24, may cause the abnormality confirmation results of the second group to be received from the master controller 12 by communication via the abnormality signal port CN34, may cause the stop command to be transmitted from the stop command communication circuit 180 to the plurality of power conversion devices 20 by communication via the stop command ports CN15 and CN25 when there is an abnormality in any of the plurality of power conversion devices 20 and the plurality of power conversion devices 20 of the second group, and may cause the stop command communication circuit 180 to transmit the stop command to the master controller 12 by communication via the stop command port CN35.

As described above, the stop command ports CN15, CN25, and CN35 are connected to each other in the stop command communication circuit 180. Therefore, the stop command transmitted to the master controller 12 via the stop command port CN35 is transmitted to the plurality of power conversion devices 20 of the second group via the stop command ports CN15 and CN25 of the master controller 12.

In the secondary mode, the processor 111 may cause the abnormality signal communication circuit 170 to receive the abnormality confirmation results of the second group from the plurality of power conversion devices 20 of the second group by communication via the abnormality signal ports CN14 and CN24, and may cause the stop command communication circuit 180 to transmit the abnormality confirmation results of the second group to the master controller 11 by communication via the abnormality signal port CN34.

As illustrated in FIG. 3, the upper connector CN40 may further include an abnormality signal port CN44 independent of the serial communication port CN41 and the start command port CN42. The upper connector CN40 may further include a stop command port CN45 independent of the serial communication port CN41, the start command port CN42, and the abnormality signal port CN44.

The lower connector CN50 may further include an abnormality signal port CN54 independent of the serial communication port CN51 and the start command port CN52. Further, the lower connector CN50 may further include a stop command port CN55 independent of the serial communication port CN51, the start command port CN52, and the abnormality signal port CN54.

The abnormality signal line CA14 of the master-to-slave cable CA10 is connected to the abnormality signal ports CN44 and CN54. The abnormality signal ports CN44 and CN54 constitute at least a part of the abnormality notification system CS31 or the third abnormality notification system CS33 (see FIG. 9). The stop command line CA15 of the master-to-slave cable CA10 is connected to the stop command ports CN45 and CN55. The stop command ports CN45 and CN55 constitute at least a part of the stop command system CS41 or the third stop command system CS43 (see FIG. 10).

The slave control circuit 300 may further include an abnormality signal communication circuit 350 and a stop command communication circuit 360. The abnormality signal communication circuit 350 is connected to the abnormality signal port CN44 of the upper connector CN40 and the abnormality signal port CN54 of the lower connector CN50. In the power conversion device 20 connected to the master controller 11, the abnormality signal communication circuit 350 is connected to the abnormality notification system CS31 via the abnormality signal ports CN44 and CN54, and communicates with the master controller 11 and the lower power conversion device 20 via the abnormality notification system CS31.

In the power conversion device 20 connected to the master controller 11 via the upper power conversion device 20, the abnormality signal communication circuit 350 is connected to the abnormality notification system CS31 via the abnormality signal ports CN44 and CN54, and communicates with the upper power conversion device 20 and the lower power conversion device 20 via the abnormality notification system CS31.

In the power conversion device 20 connected to the master controller 12, the abnormality signal communication circuit 350 is connected to the third abnormality notification system CS33 via the abnormality signal ports CN44 and CN54, and communicates with the master controller 12 and the lower power conversion device 20 via the third abnormality notification system CS33.

In the power conversion device 20 connected to the master controller 12 via the upper power conversion device 20, the abnormality signal communication circuit 350 is connected to the third abnormality notification system CS33 via the abnormality signal ports CN44 and CN54, and communicates with the upper power conversion device 20 and the lower power conversion device 20 via the third abnormality notification system CS33.

The stop command communication circuit 360 is connected to the stop command port CN45 of the upper connector CN40 and the stop command port CN55 of the lower connector CN50. The stop command ports CN45 and CN55 are connected to each other in the stop command communication circuit 360.

In the power conversion device 20 connected to the master controller 11, the stop command communication circuit 360 is connected to the stop command system CS41 via the stop command ports CN45 and CN55, and communicates with the master controller 11 and the lower power conversion device 20 via the stop command system CS41.

In the power conversion device 20 connected to the master controller 11 via the upper power conversion device 20, the stop command communication circuit 360 is connected to the stop command system CS41 via the stop command ports CN45 and CN55, and communicates with the upper power conversion device 20 and the lower power conversion device 20 via the stop command system CS41.

In the power conversion device 20 connected to the master controller 12, the stop command communication circuit 360 is connected to the third stop command system CS43 via the stop command ports CN45 and CN55, and communicates with the master controller 12 and the lower power conversion device 20 via the third stop command system CS43.

In the power conversion device 20 connected to the master controller 12 via the upper power conversion device 20, the stop command communication circuit 360 is connected to the third stop command system CS43 via the stop command ports CN45 and CN55, and communicates with the upper power conversion device 20 and the lower power conversion device 20 via the third stop command system CS43.

In this case, the program stored in the storage 313 may be configured to further cause the master control circuit 100 to confirm the presence or absence of the abnormality of each own device based on the current detection result or the like acquired by the sensor information acquisition circuit 314, transmit the abnormality confirmation result (the confirmation result of the presence or absence of the abnormality) from the abnormality signal communication circuit 350 to the master controller 10 by communication via the abnormality signal port CN44, and stop the output of the secondary power by the PWM control circuit 315 when the stop command communication circuit 360 receives the stop command from the master controller 10 by communication via the stop command port CN45.

By executing the program stored in the storage 313, the processor 311 may confirm the presence or absence of the abnormality of each own device based on the current detection result or the like acquired by the sensor information acquisition circuit 314, transmit the abnormality confirmation result (the confirmation result of the presence or absence of the abnormality) from the abnormality signal communication circuit 350 to the master controller 10 by communication via the abnormality signal port CN44, and stop the output of the secondary power by the PWM control circuit 315 when the stop command communication circuit 360 receives the stop command from the master controller 10 by communication via the stop command port CN45.

The plurality of power conversion devices 20 may be communicatively connected in series to the master controller 10 by the abnormality notification system CS31 or the third abnormality notification system CS33, and may be communicatively connected in parallel to the master controller 10 by the stop command system CS41 or the third stop command system CS43.

Here, a serial communication connection means a connection in which the outputs of the plurality of power conversion devices 20 are summed and input to the master controller 10. The summing includes the OR logical operation. As described above, a parallel communication connection means a connection in which the output of the master controller 10 is directly input to each of the plurality of power conversion devices 20. By the parallel communication connection by the stop command system CS41, the plurality of power conversion devices 20 receive, in parallel, the stop command from the master controller 10. Each of the plurality of power conversion devices 20 may be configured to combine a signal indicating an own device abnormality confirmation result with the abnormality confirmation signal transmitted to the master controller 10 by the abnormality notification system CS31 or the third abnormality notification system CS33. In this case, the master controller 10 receives the abnormality confirmation signal such that the signals indicating the abnormality confirmation result of each of the plurality of power conversion devices 20 are combined.

Figure 9:
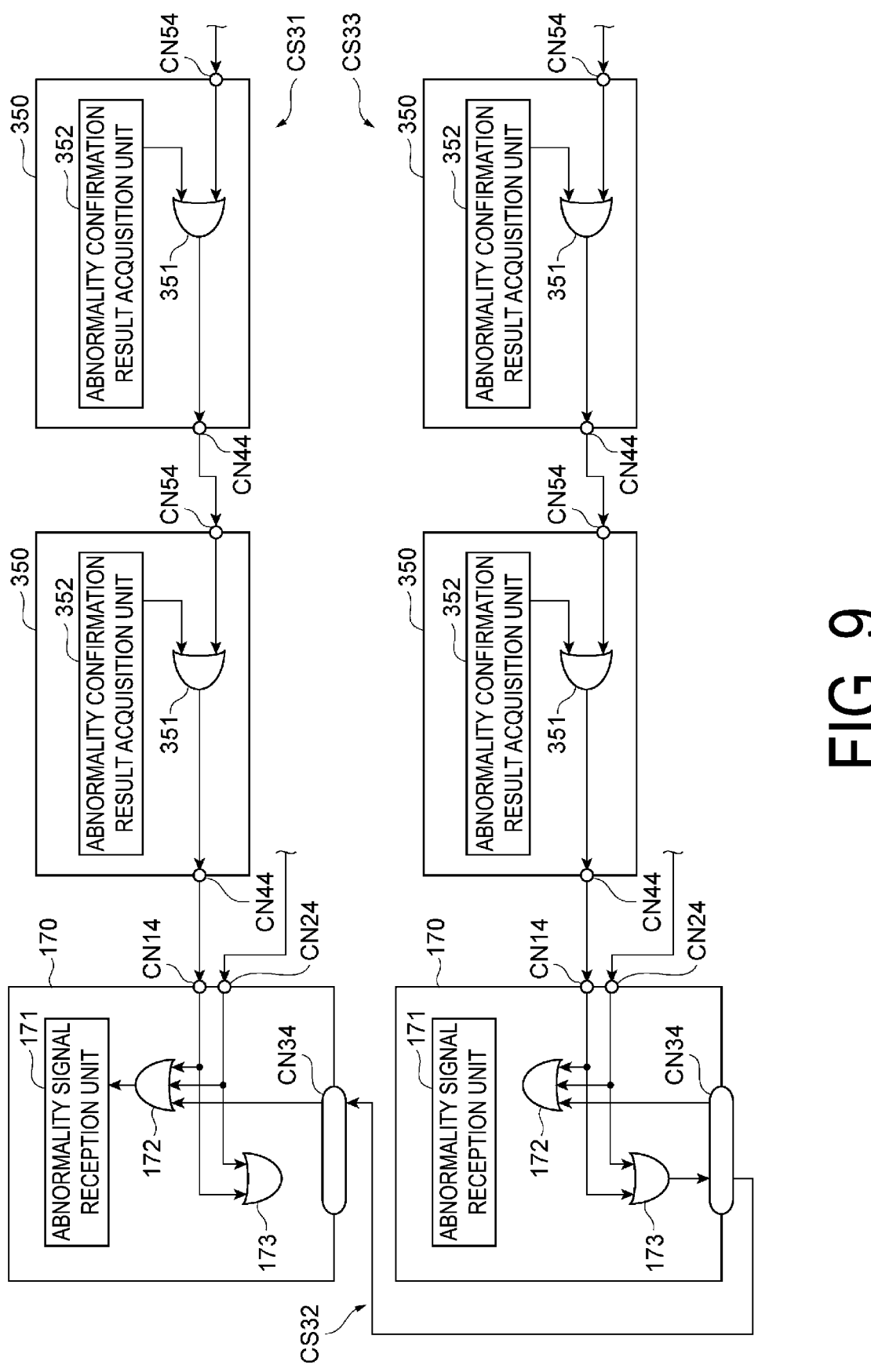
FIG. 9 is a block diagram illustrating a functional configuration of an abnormality signal communication circuit.

For example, as illustrated in FIG. 9, the abnormality signal communication circuit 170 includes an abnormality signal reception unit 171 and OR operation units 172, 173. In the primary mode, the OR operation unit 172 performs an OR operation of the abnormality confirmation result received from the power conversion device 20 by communication via the abnormality signal port CN14, the abnormality confirmation result received from the power conversion device 20 by communication via the abnormality signal port CN24, and the abnormality confirmation result received from the master controller 12 by communication via the abnormality signal port CN34. In the primary mode, the abnormality signal reception unit 171 acquires the operation result by the OR operation unit 172.

In the secondary mode, the OR operation unit 173 performs an OR operation of the abnormality confirmation result received from the power conversion device 20 by communication via the abnormality signal port CN14 and the abnormality confirmation result received from the power conversion device 20 by communication via the abnormality signal port CN24, and transmits the operation result to the master controller 11 by communication via the abnormality signal port CN34.

The abnormality signal communication circuit 350 includes an OR operation unit 351 and a confirmation result acquisition unit 352. The confirmation result acquisition unit 352 acquires the abnormality confirmation result of each own device. The OR operation unit 351 combines the abnormality confirmation result by the confirmation result acquisition unit 352 with the signal transmitted to the master controller 10 by the abnormality notification system CS31 or the third abnormality notification system CS33. For example, the OR operation unit 351 performs an OR operation of the abnormality confirmation result acquired by the confirmation result acquisition unit 352 and the abnormality confirmation result received from the lower power conversion device 20 by communication via the abnormality signal port CN54, and transmits the operation result to the master controller 10 or the upper power conversion device 20 by communication via the abnormality signal port CN44.

According to the above configuration, the abnormality confirmation results of any of the plurality of power conversion devices 20 of the second group are combined into one OR operation result and input to the abnormality signal port CN14 of the master controller 12, and the remaining abnormality confirmation results of the plurality of power conversion devices 20 of the second group are combined into one OR operation result and input to the abnormality signal port CN24 of the master controller 12.

For example, an OR operation result of the abnormality confirmation results of the power conversion devices 22A, 22B, and 22C is input to the abnormality signal port CN14, and an OR operation result of the abnormality confirmation results of the power conversion devices 22D, 22E, and 22F is input to the abnormality signal port CN24. The OR operation result input to the abnormality signal port CN14 and the OR operation result input to the abnormality signal port CN24 are combined into one OR operation result by the OR operation of the OR operation unit 173. Thus, an OR operation result of the abnormality confirmation results of the power conversion devices 22A, 22B, 22C, 22D, 22E, and 22F is generated. Hereinafter, this is referred to as the OR operation result of the second group. The OR operation result of the second group is transmitted to the master controller 11 by communication via the abnormality signal port CN34.

In addition, the abnormality confirmation results of any of the plurality of power conversion devices 20 are combined into one OR operation result and input to the abnormality signal port CN14 of the master controller 11, and the remaining abnormality confirmation results of the plurality of power conversion devices 20 are combined into one OR operation result and input to the abnormality signal port CN24 of the master controller 11.

For example, an OR operation result of the abnormality confirmation results of the power conversion devices 21A, 21B, and 21C is input to the abnormality signal port CN14, and an OR operation result of the abnormality confirmation results of the power conversion devices 21D, 21E, and 21F is input to the abnormality signal port CN24. The OR operation result of the second group transmitted by the master controller 12 is input to the abnormality signal port CN34. The OR operation result input to the abnormality signal port CN14, the OR operation result input to the abnormality signal port CN24, and the OR operation result input to the abnormality signal port CN34 are combined into one OR operation result by the OR operation of the OR operation unit 172. Thus, an OR operation result of the abnormality confirmation results of the power conversion devices 21A, 21B, 21C, 21D, 21E, 21F, 22A, 22B, 22C, 22D, 22E, and 22F is generated. Hereinafter, this is referred to as an entire OR operation result.

The entire OR operation result indicates whether there is an abnormality in any of the power conversion devices 21A, 21B, 21C, 21D, 21E, 21F, 22A, 22B, 22C, 22D, 22E, and 22F. For example, the entire OR operation result becomes TRUE when there is an abnormality in any of the power conversion devices 21A, 21B, 21C, 21D, 21E, 21F, 22A, 22B, 22C, 22D, 22E, and 22F, and becomes FALSE when there is no abnormality in any of the power conversion devices 21A, 21B, 21C, 21D, 21E, 21F, 22A, 22B, 22C, 22D, 22E, and 22F. The entire OR operation result is acquired by the abnormality signal reception unit 171 of the master controller 11.

Figure 10:
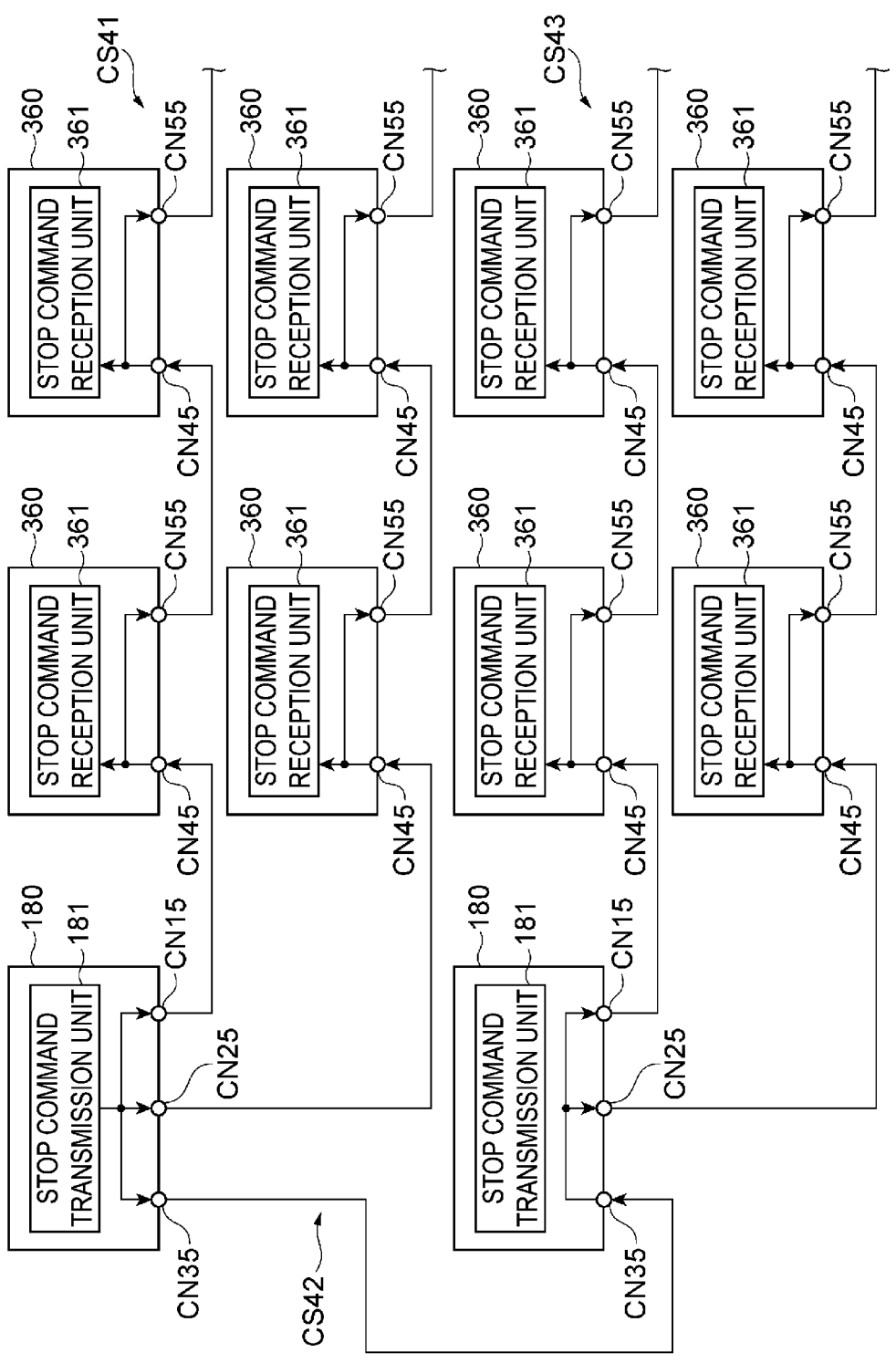
FIG. 10 is a block diagram illustrating a functional configuration of a stop command communication circuit.

As illustrated in FIG. 10, the stop command communication circuit 180 includes a stop command transmission unit 181, and the stop command communication circuit 360 includes a stop command reception unit 361. The stop command transmission unit 181 of the master controller 11 transmits the stop command to the master controller 12 via the stop command port CN35, and transmits the stop command to the plurality of power conversion devices 20 via the stop command ports CN15 and CN25.

As described above, the stop command ports CN15, CN25, and CN35 are connected to each other in the stop command communication circuit 180. Therefore, the stop command transmitted to the master controller 12 via the stop command port CN35 is transmitted to the plurality of power conversion devices 20 of the second group via the stop command ports CN15 and CN25 of the master controller 12.

The stop command reception unit 361 receives the stop command from the master controller 10 or the upper power conversion device 20 via the stop command port CN45. As described above, the stop command ports CN45 and CN55 are connected to each other in the stop command communication circuit 360. Therefore, the stop command received by the stop command reception unit 361 is further transmitted to the lower power conversion device 20 via the stop command port CN55.

Returning to FIG. 1, the master controller 10 may be capable of communicating with the plurality of power conversion devices 20 also by a synchronization system different from the serial communication system CS01, the start command system CS11, the abnormality notification system CS31, and the stop command system CS41. The master controller 10 may transmit a synchronization signal to the plurality of power conversion devices 20 by the synchronization system, and each of the plurality of power conversion devices 20 may synchronize an own device carrier wave with the synchronization signal when receiving the synchronization signal, and may perform power conversion based on the control command by switching on and off one or more switching elements 38 in a cycle of the synchronized carrier wave.

In the case where the power conversion system 1 includes the master controllers 11 and 12, the master controller 12 may be capable of communicating with the master controller 11 also by a second synchronization system different from the second serial communication system CS02, the second start command system CS12, the second abnormality notification system CS32, and the second stop command system CS42. The master controller 12 may also be capable of communicating with the plurality of power conversion devices 20 of the second group also by a third synchronization system different from the third serial communication system CS03, the third start command system CS13, the third abnormality notification system CS33, and the third stop command system CS43.

The master controller 11 may transmit the synchronization signal to the plurality of power conversion devices 20 by the synchronization system, and may transmit the synchronization signal to the master controller 12 by the second synchronization system. The master controller 12 may transmit the second synchronization signal synchronized with the synchronization signal received from the master controller 11 to the plurality of master controllers 12 of the second group by the third synchronization system.

Each of the plurality of power conversion devices 20 may synchronize an own device carrier wave with the synchronization signal when receiving the synchronization signal, and may perform power conversion based on the control command by switching on and off one or more switching elements 38 in a cycle of the synchronized carrier wave. Each of the plurality of power conversion devices 20 of the second group may synchronize an own device carrier wave with the second synchronization signal when receiving the second synchronization signal, and may perform power conversion based on the control command by switching on and off one or more switching elements 38 in a cycle of the synchronized carrier wave.

The synchronization system, the second synchronization system, and the third synchronization system may each be a wired system or a wireless system. For example, the wired synchronization system is constituted by another communication line independent of the communication line constituting the serial communication system. The wireless stop command system is constituted by a transceiver for a wireless signal in a frequency band different from the frequency band of the serial communication system.

For example, as illustrated in FIG. 2, the master-to-slave connector CN10 may further include a synchronization port CN13 independent of the serial communication port CN11, the start command port CN12, the abnormality signal port CN14, and the stop command port CN15.

The master-to-slave connector CN20 may further include a synchronization port CN23 independent of the serial communication port CN21, the start command port CN22, the abnormality signal port CN24, and the stop command port CN25.

The master-to-slave cable CA10 may include a synchronization line CA13 that is connected to the synchronization ports CN13 and CN23 independently of the serial communication line CA11, the start command line CA12, the abnormality signal line CA14, and the stop command line CA15. The synchronization ports CN13 and CN23 and the synchronization line CA13 constitute at least a part of a synchronization system CS21 or a third synchronization system CS23 (see FIG. 11).

The master-to-master connector CN30 may further include a synchronization port CN33 independent of the serial communication port CN31, the start command port CN32, the abnormality signal port CN34, and the stop command port CN35.

The master-to-master cable CA20 may include a synchronization line CA23 connected to the synchronization port CN33 independently of the serial communication line CA21, the start command line CA22, the abnormality signal line CA24, and the stop command line CA25. The synchronization port CN33 and the synchronization line CA23 constitute at least a part of a second synchronization system CS22 (see FIG. 11).

The master control circuit 100 may further include a synchronization signal communication circuit 160. The synchronization signal communication circuit 160 is connected to the synchronization port CN13 of the master-to-slave connector CN10, the synchronization port CN23 of the master-to-slave connector CN20, and the synchronization port CN33 of the master-to-master connector CN30.

In the master controller 11 in the primary mode, the synchronization signal communication circuit 160 is connected to the synchronization system CS21 via the synchronization ports CN13 and CN23, and transmits a synchronization signal to the plurality of power conversion devices 20 by the synchronization system CS21. Further, the synchronization signal communication circuit 160 is connected to the second synchronization system CS22 via the synchronization port CN33, and transmits the stop command to the master controller 12 by the second synchronization system CS22.

In the master controller 12 in the secondary mode, the synchronization signal communication circuit 160 is connected to the synchronization system CS21 via the synchronization port CN33, receives the synchronization signal from the master controller 11 by the second synchronization system CS22, and generates the second synchronization signal synchronized with the synchronization signal. Further, the synchronization signal communication circuit 160 is connected to the third synchronization system CS23 via the synchronization ports CN13 and CN23, and transmits the second synchronization signal to the plurality of power conversion devices 20 of the second group by the third synchronization system CS23.

In this case, the program stored in the storage 113 may be configured to further cause the master control circuit 100 to transmit a synchronization signal from the stop command communication circuit 180 to the plurality of power conversion devices 20 by communication via the synchronization ports CN13 and CN23.

As described above, the program stored in the storage 113 may be configured to further cause the master control circuit 100 to switch the operation mode between the primary mode and the secondary mode. The program in this case may be configured to cause the master control circuit 100 to further execute, in the primary mode, transmitting the synchronization signal from the stop command communication circuit 180 to the plurality of power conversion devices 20 by communication via the synchronization ports CN13 and CN23, and transmitting the synchronization signal from the synchronization signal communication circuit 160 to the master controller 12 by communication via the synchronization port CN33.

Further, the program in this case may be configured to cause the master control circuit 100 to further execute, in the secondary mode, receiving a synchronization signal from the master controller 11 to the synchronization signal communication circuit 160 by communication via the synchronization port CN33, generating a second synchronization signal synchronized with the synchronization signal by the synchronization signal communication circuit 160, and transmitting the second synchronization signal from the synchronization signal communication circuit 160 to the plurality of power conversion devices 20 of the second group by communication via steps S13 and S23.

By executing the program stored in the storage 113, the processor 111 may cause the synchronization signal communication circuit 160 to transmit the synchronization signal to the plurality of power conversion devices 20 by communication via the synchronization ports CN13 and CN23.

In the primary mode, the processor 111 may cause the synchronization signal communication circuit 160 to transmit the synchronization signal to the plurality of power conversion devices 20 by communication via the synchronization ports CN13 and CN23, and may cause the synchronization signal communication circuit 160 to transmit the synchronization signal to the master controller 12 by communication via the synchronization port CN33.

In the secondary mode, the processor 111 may cause the synchronization signal communication circuit 160 to receive the synchronization signal from the master controller 11 by communication via the synchronization port CN33, cause the synchronization signal communication circuit 160 to generate a second synchronization signal synchronized with the synchronization signal, and cause the synchronization signal communication circuit 160 to transmit the second synchronization signal to the plurality of power conversion devices 20 of the second group by communication via the synchronization ports CN13 and CN23.

As illustrated in FIG. 3, the upper connector CN40 may further include a synchronization port CN43 independent of the serial communication port CN41, the start command port CN42, the abnormality signal port CN44, and the stop command port CN45. The lower connector CN50 may further include a synchronization port CN53 independent of the serial communication port CN51, the start command port CN52, the abnormality signal port CN54, and the stop command port CN55. A synchronization line CA13 of the master-to-slave cable CA10 is connected to the synchronization ports CN43 and CN53. The synchronization ports CN43 and CN53 constitute at least a part of the synchronization system CS21 or the third synchronization system CS23 (see FIG. 11).

The slave control circuit 300 may further include a synchronization signal communication circuit 340. The synchronization signal communication circuit 340 is connected to the synchronization port CN43 of the upper connector CN40 and the synchronization port CN53 of the lower connector CN50. The synchronization ports CN43 and CN53 are connected to each other in the synchronization signal communication circuit 340.

In the power conversion device 20 connected to the master controller 11, the synchronization signal communication circuit 340 is connected to the synchronization system CS21 via the synchronization ports CN43 and CN53, and communicates with the master controller 11 and the lower power conversion device 20 via the synchronization system CS21. In the power conversion device 20 connected to the master controller 11 via the upper power conversion device 20, the synchronization signal communication circuit 340 is connected to the synchronization system CS21 via the synchronization ports CN43 and CN53, and communicates with the upper power conversion device 20 and the lower power conversion device 20 via the synchronization system CS21.

In the power conversion device 20 connected to the master controller 12, the synchronization signal communication circuit 340 is connected to the third synchronization system CS23 via the synchronization ports CN43 and CN53, and communicates with the master controller 12 and the lower power conversion device 20 via the third synchronization system CS23. In the power conversion device 20 connected to the master controller 12 via the upper power conversion device 20, the synchronization signal communication circuit 340 is connected to the third synchronization system CS23 via the synchronization ports CN43 and CN53, and communicates with the upper power conversion device 20 and the lower power conversion device 20 via the third synchronization system CS23.

In this case, the program stored in the storage 313 may be configured to further cause the slave control circuit 300 to synchronize the carrier wave in the PWM control circuit 315 with the synchronization signal or the second synchronization signal when receiving the synchronization signal or the second synchronization signal by communication via the synchronization port CN43, and to cause the PWM control circuit 315 to switch on and off the one or more switching elements 38 in the cycle of the synchronized carrier wave.

By executing the program stored in the storage 313, the processor 311 may synchronize the carrier wave in the PWM control circuit 315 with the synchronization signal or the second synchronization signal when receiving the synchronization signal or the second synchronization signal by communication via the synchronization port CN43, and may cause the PWM control circuit 315 to switch on and off the one or more switching elements 38 in the cycle of the synchronized carrier wave.

Figure 11:
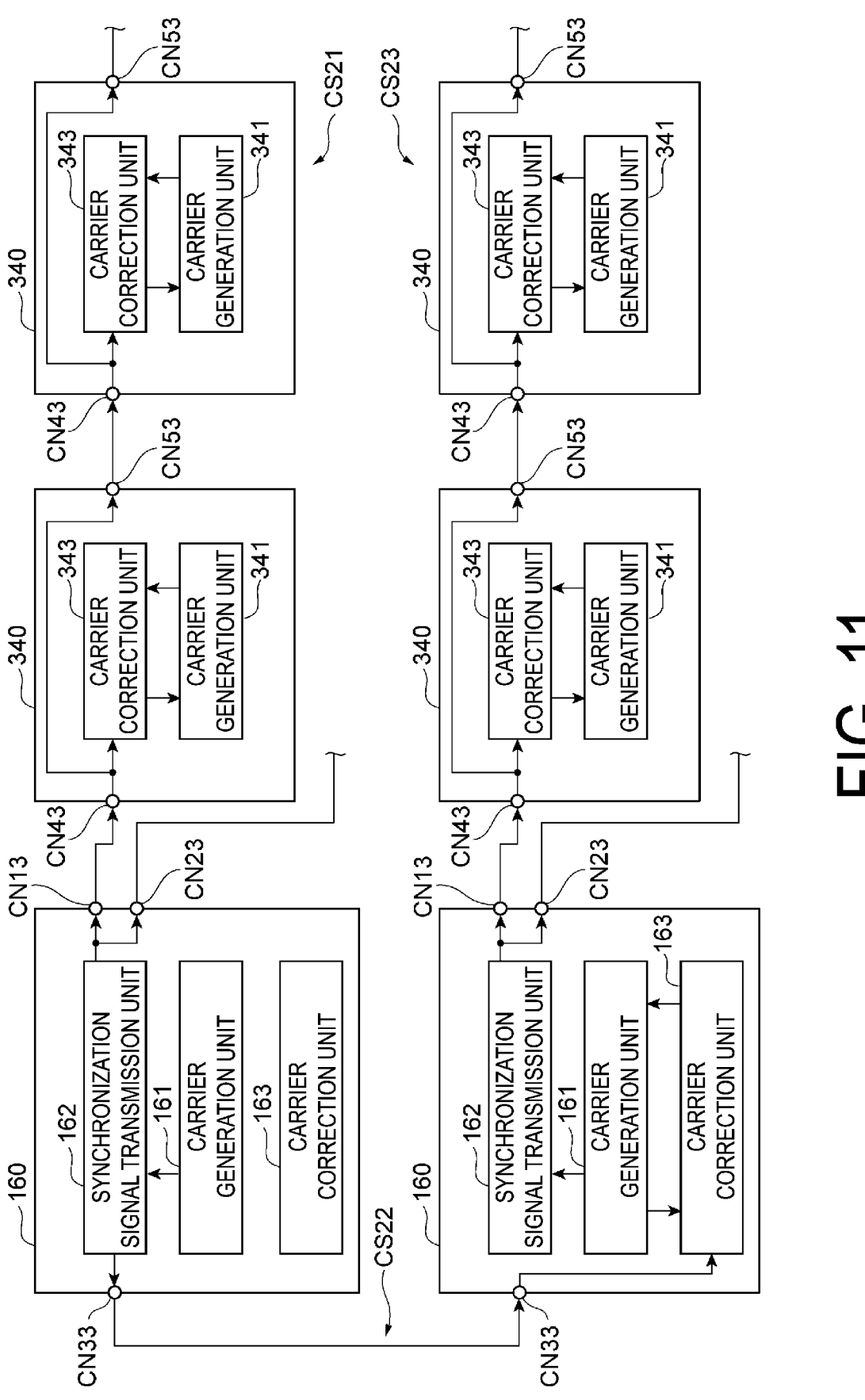
FIG. 11 is a block diagram illustrating a functional configuration of a synchronization signal communication circuit.

As illustrated in FIG. 11, the synchronization signal communication circuit 160 includes a carrier generation unit 161, a synchronization signal transmission unit 162, and a carrier correction unit 163. The carrier generation unit 161 generates a carrier wave. For example, in the primary mode, the synchronization signal transmission unit 162 generates the synchronization signal synchronized with the carrier wave generated by the carrier generation unit 161, transmits the synchronization signal to the plurality of power conversion devices 20 via the synchronization ports CN13 and CN23, and transmits the synchronization signal to the master controller 12 via the synchronization port CN33.

In the secondary mode, the carrier correction unit 163 receives the synchronization signal from the master controller 11 via the synchronization port CN33, and synchronizes the carrier wave generated by the carrier generation unit 161 with the received synchronization signal. For example, the carrier correction unit 163 synchronizes the carrier wave with the synchronization signal by changing at least one of the cycle and the phase of the carrier wave generated by the carrier generation unit 161. Thereafter, the synchronization signal transmission unit 162 generates a second synchronization signal synchronized with the carrier wave generated by the carrier generation unit 161, and transmits the second synchronization signal to the plurality of power conversion devices 20 via the synchronization ports CN13 and CN23. In the secondary mode, the synchronization signal transmission unit 162 may transmit the synchronization signal received from the master controller 11 to the plurality of power conversion devices 20 as it is as the second synchronization signal.

The synchronization signal communication circuit 340 includes a carrier generation unit 341 and a carrier correction unit 343. The carrier generation unit 341 generates the carrier wave for causing the PWM control circuit 315 to switch on and off the switching element 38. The carrier correction unit 343 receives the synchronization signal or the second synchronization signal via the synchronization port CN43, and synchronizes the carrier wave generated by the carrier generation unit 341 with the received synchronization signal or the second synchronization signal. For example, the carrier correction unit 343 synchronizes the carrier wave with the synchronization signal or the second synchronization signal by changing at least one of the cycle and the phase of the carrier wave generated by the carrier generation unit 341.

As a result, the carrier wave in the PWM control circuit 315 is synchronized with the synchronization signal or the second synchronization signal.

As described above, the synchronization ports CN43 and CN53 are connected to each other in the synchronization signal communication circuit 340. Therefore, the synchronization signal or the second synchronization signal received by the carrier correction unit 343 is further transmitted to the lower power conversion device 20 via the synchronization port CN53.

The plurality of power conversion devices 20 may be communicatively connected in parallel to the master controller 10 by the synchronization system CS21 or the third synchronization system CS23. As described above, a parallel communication connection means a connection in which the output of the master controller 10 is directly input to each of the plurality of power conversion devices 20. By the parallel communication connection by the synchronization system CS21 or the third synchronization system CS23, the plurality of power conversion devices 20 receive, in parallel, the synchronization signal from the master controller 10.

Power Conversion Procedure

Next, as an example of the power conversion method, a power conversion procedure executed by the power conversion system 1 will be exemplified. The procedure includes a master control procedure in the primary mode, a master control procedure in the secondary mode, and a slave control procedure. The procedure may further include a synchronization signal transmission procedure in the primary mode, a synchronization signal transmission procedure in the secondary mode, and a carrier synchronization procedure. The procedure may further include an abnormality confirmation result transmission procedure, an abnormality confirmation result transfer procedure, a stop command transmission procedure based on an abnormality confirmation result, and a stop control procedure. Examples of the procedures are described in detail below.

Master Control Procedure in Primary Mode

Figure 12:
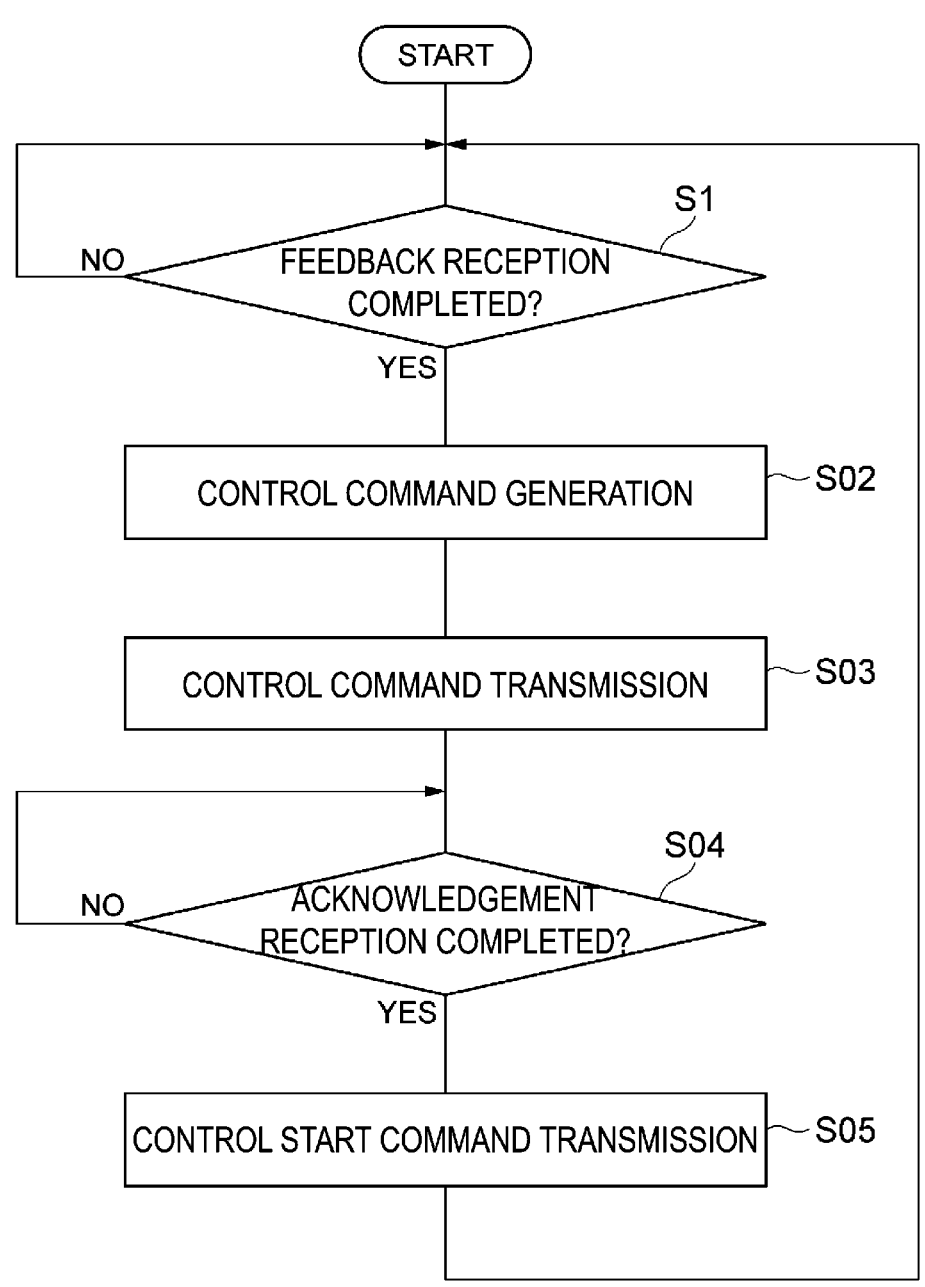
FIG. 12 is a flowchart illustrating a master control procedure in a primary mode.

This procedure is a control procedure executed by the master control circuit 100 of the master controller 11 in the primary mode. As illustrated in FIG. 12, the master control circuit 100 sequentially executes steps S01, S02, S03, S04, and S05. In step S01, the processor 111 waits for the serial communication circuit 114 to receive the feedback signals of the first group from the plurality of power conversion devices 20 by serial communication via the serial communication ports CN11 and CN21 and for the serial communication circuit 114 to receive the feedback signals of the second group from the master controller 12 by serial communication via the serial communication port CN31.

In step S02, the processor 111 generates the control command according to the feedback signals of the first group and the feedback signals of the second group. In step S03, the processor 111 transmits the control command from the serial communication circuit 114 to the plurality of power conversion devices 20 by serial communication via the serial communication ports CN11 and CN21, and transmits the control command from the serial communication circuit 114 to the master controller 12 by serial communication via the serial communication port CN31.

In step S04, the processor 111 waits for the serial communication circuit 114 to receive the reception notifications of the control commands from all of the plurality of power conversion devices 20 by serial communication via the serial communication ports CN11 and CN21, and for the serial communication circuit 114 to receive the reception notification of the control command from the master controller 12 by serial communication via the serial communication port CN31.

In step S05, the processor 111 causes the start command communication circuit 150 to transmit the start command to each of the plurality of power conversion devices 20 by communication via the start command ports CN12 and CN22, and causes the start command communication circuit 150 to transmit the start command to the master controller 12 by communication via the start command port CN32. Accordingly, the start command is also transmitted from the start command communication circuit 150 of the master controller 12 to each of the plurality of power conversion devices 20 of the second group. Thereafter, the master controller 11 returns the processing to step S01. The master control circuit 100 repeats the above processing.

Master Control Procedure in Secondary Mode

Figure 13:
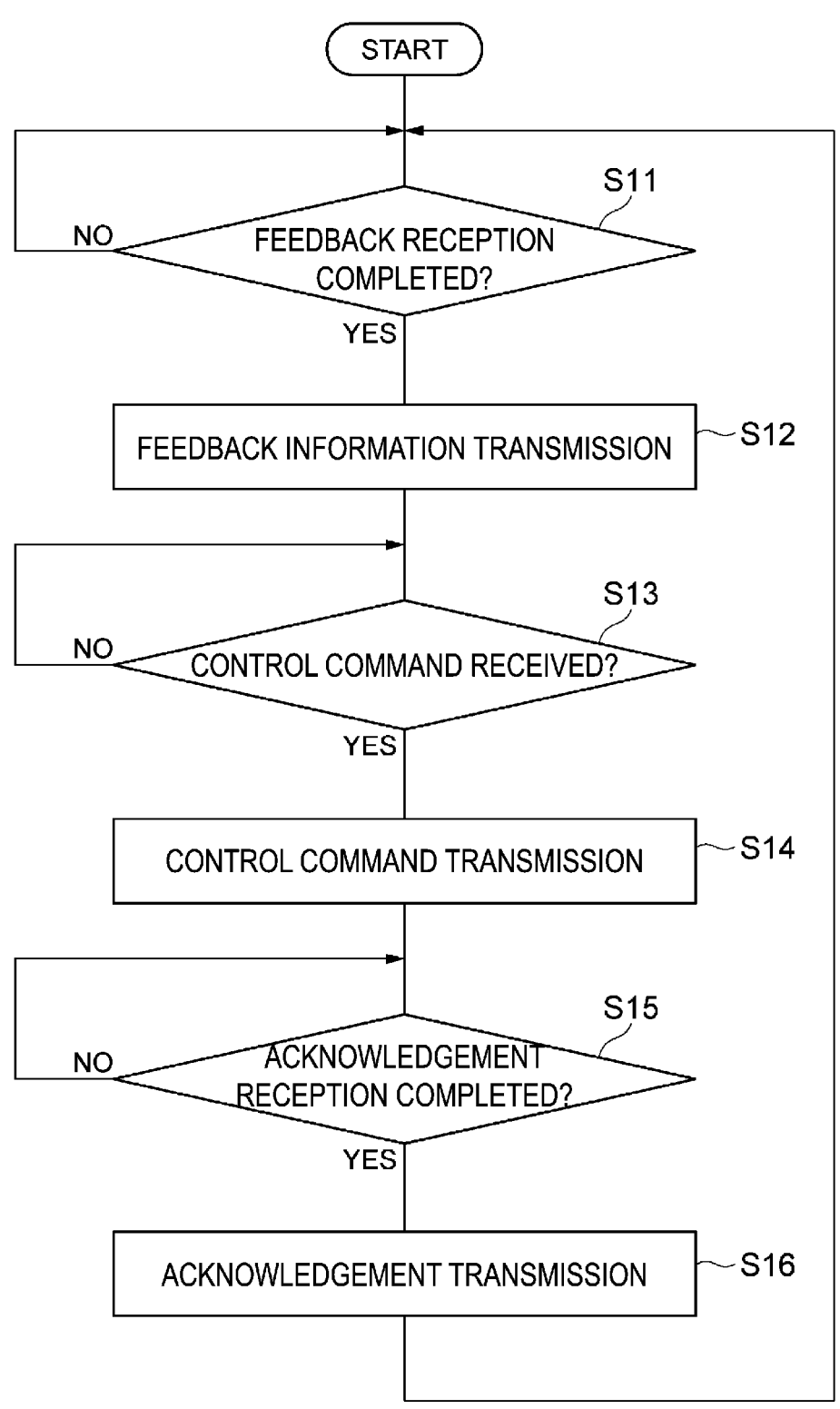
FIG. 13 is a flowchart illustrating a master control procedure in a secondary mode.

This procedure is a control procedure executed by the master control circuit 100 of the master controller 12 in the secondary mode. As illustrated in FIG. 13, the master control circuit 100 sequentially executes steps S11, S12, S13, S14, S15, and S16.

In step S11, the processor 111 waits for the serial communication circuit 114 to receive the feedback signals of the second group from the plurality of power conversion devices 20 of the second group by serial communication via the serial communication ports CN11 and CN21. In step S12, the processor 111 transmits the feedback signal received by the serial communication circuit 114 from the serial communication circuit 114 to the master controller 11 by serial communication via the serial communication port CN31.

In step S13, the processor 111 waits for the serial communication circuit 114 to receive the control command from the master controller 11 by serial communication via the serial communication port CN31. In step S14, the processor 111 causes the serial communication circuit 114 to transmit the control command received by the serial communication circuit 114 to the plurality of power conversion devices 20 of the second group by serial communication via the serial communication ports CN11 and CN21.

In step S15, the processor 111 waits for the serial communication circuit 114 to receive the reception notifications of the control commands from all of the plurality of power conversion devices 20 of the second group by serial communication via the serial communication ports CN11 and CN21. In step S16, the processor 111 transmits the reception notification of the control command from the serial communication circuit 114 to the master controller 11 by serial communication via the serial communication port CN31. Thereafter, the master control circuit 100 returns the processing to step S11. The master control circuit 100 repeats the above processing.

Slave Control Procedure

Figure 14:
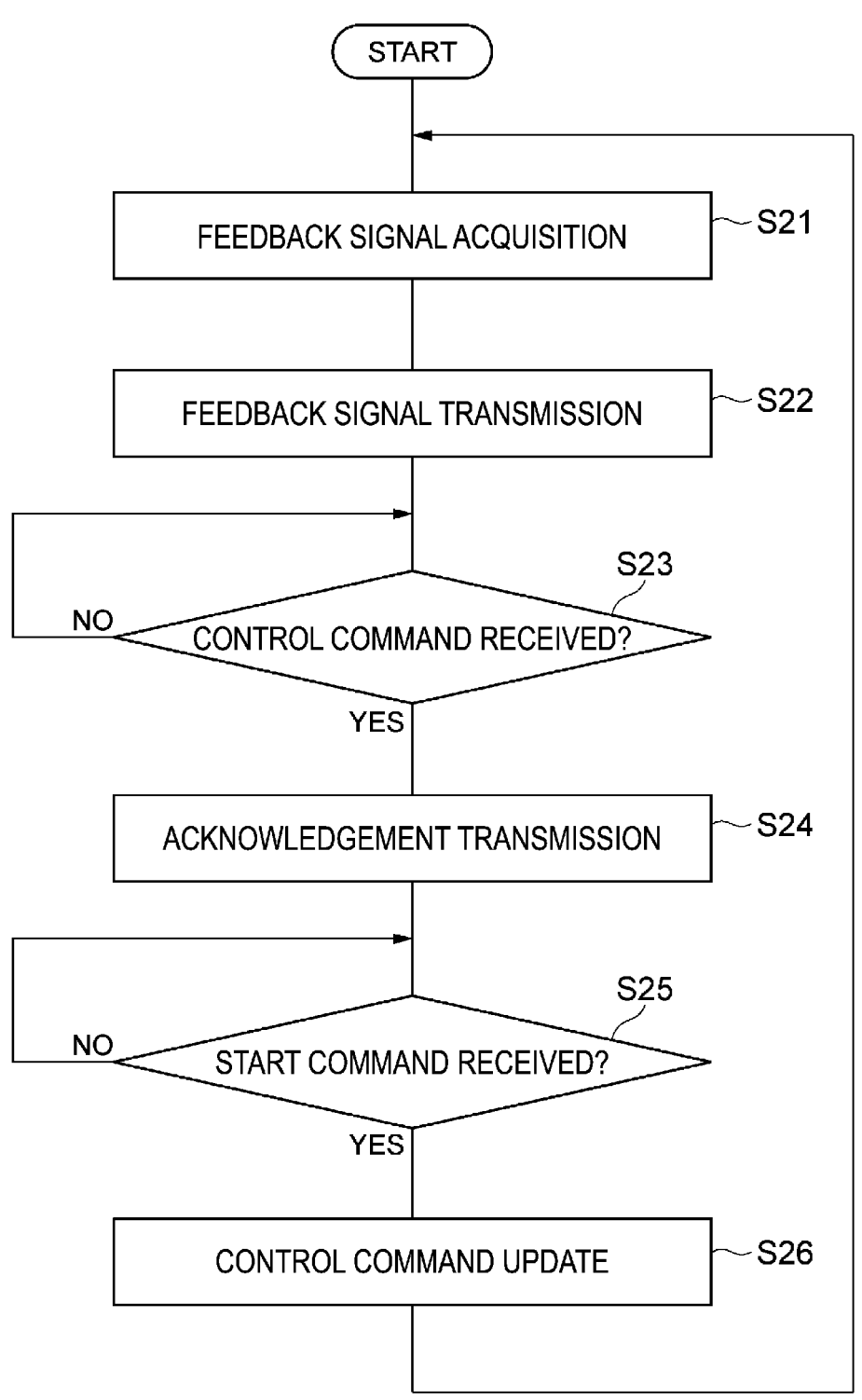
FIG. 14 is a flowchart illustrating a slave control procedure.

This procedure is a control procedure executed by the slave control circuit 300 of the power conversion device 20. As illustrated in FIG. 14, the slave control circuit 300 sequentially executes steps S21, S22, S23, S24, S25, and S26. In step S21, the processor 311 acquires the feedback signal indicating the state of the power conversion circuit 30. For example, the processor 311 causes the sensor information acquisition circuit 314 to acquire the current detection result by the current sensor 35. In step S22, the processor 311 transmits the feedback signal from the serial communication circuit 316 to the master controller 10 by serial communication via the serial communication port CN41.

In step S23, the processor 311 waits for the serial communication circuit 316 to receive the control command by serial communication via the serial communication port CN41. In step S24, the processor 311 transmits the reception notification of the control command from the serial communication circuit 316 to the master controller 10 by serial communication via the serial communication port CN41.

In step S25, the processor 311 waits for the start command communication circuit 330 to receive the start command by communication via the start command port CN42. In step S26, the processor 311 causes the PWM control circuit 315 to start power conversion by the power conversion circuit 30 based on the received control command. Thereafter, the master controller 10 returns the processing to step S21. The slave control circuit 300 repeats the above processing.

Synchronization Signal Transmission Procedure in Primary Mode

Figure 15:
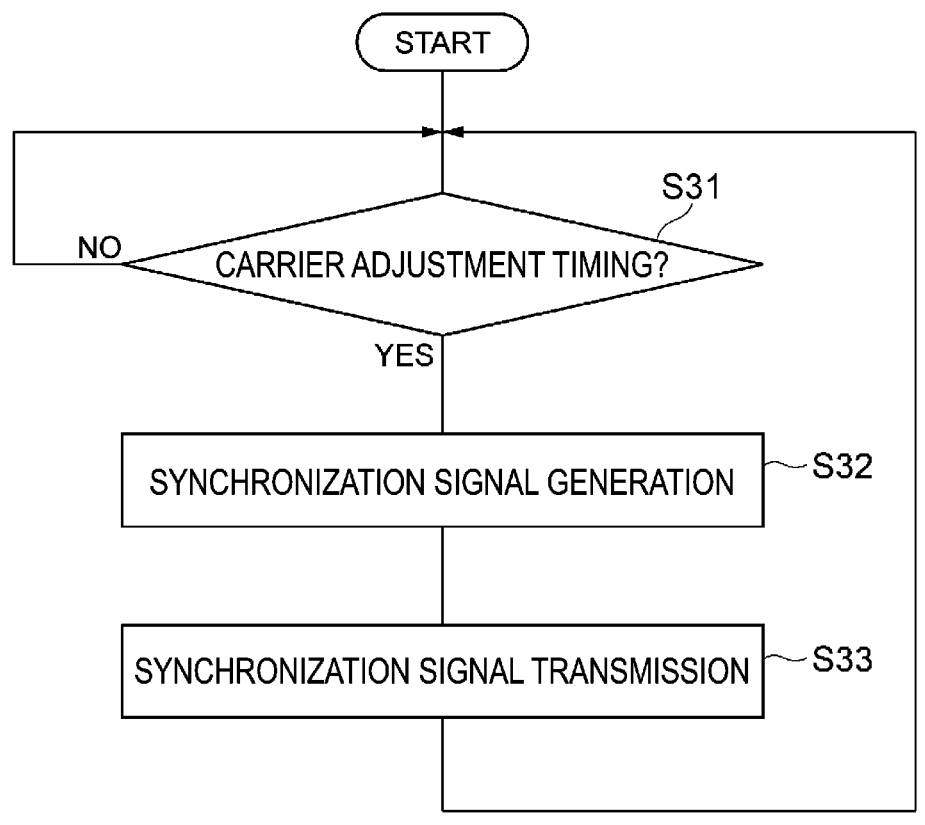
FIG. 15 is a flowchart illustrating a synchronization signal transmission procedure in the primary mode.

This procedure is a synchronization signal transmission procedure executed by the master control circuit 100 of the master controller 11 in the primary mode. As illustrated in FIG. 15, the master control circuit 100 sequentially executes steps S31, S32, and S33. In step S31, the processor 111 waits for a predetermined carrier adjustment timing. The carrier adjustment timing is determined in advance so as to be repeated at a predetermined carrier adjustment cycle.

In step S32, the processor 111 requests the synchronization signal communication circuit 160 to generate the synchronization signal. In response to this, the synchronization signal transmission unit 162 generates the synchronization signal based on the carrier wave generated by the carrier generation unit 161. In step S33, the synchronization signal transmission unit 162 transmits the synchronization signal to the plurality of power conversion devices 20 by communication via the synchronization ports CN13 and CN23, and transmits the synchronization signal to the master controller 12 by communication via the synchronization port CN33. Thereafter, the master control circuit 100 returns the processing to step S31. The master control circuit 100 repeats the above processing.

Synchronization Signal Transmission Procedure in Secondary Mode

Figure 16:
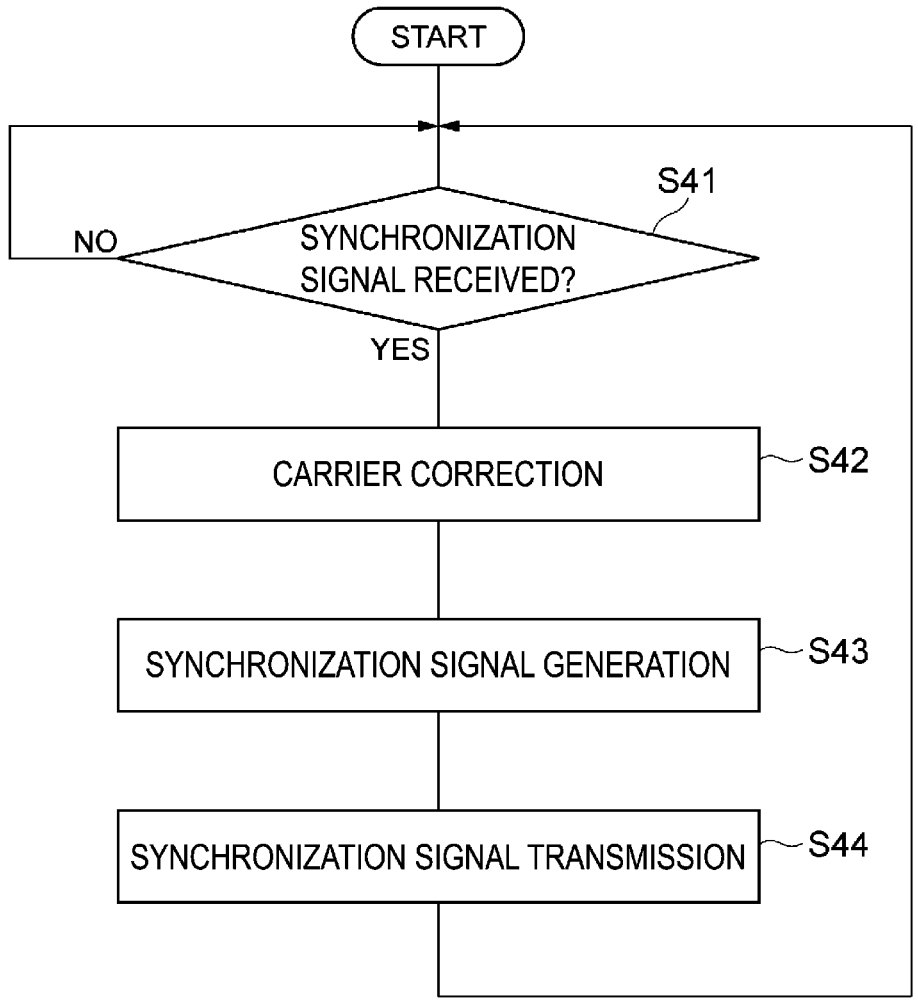
FIG. 16 is a flowchart illustrating a synchronization signal transmission procedure in the secondary mode.

This procedure is a synchronization signal transmission procedure executed by the master control circuit 100 of the master controller 12 in the secondary mode. As illustrated in FIG. 16, the master control circuit 100 sequentially executes steps S41, S42, S43, and S44. In step S41, the carrier correction unit 163 waits for reception of the synchronization signal from the master controller 11 by communication via the synchronization port CN33.

In step S42, the carrier correction unit 163 synchronizes the carrier wave generated by the carrier generation unit 161 with the received synchronization signal. In step S43, the synchronization signal transmission unit 162 generates the second synchronization signal synchronized with the carrier wave generated by the carrier generation unit 161.

In step S44, the synchronization signal transmission unit 162 transmits the second synchronization signal to the plurality of power conversion devices 20 of the second group by communication via the synchronization ports CN13 and CN23. Thereafter, the master control circuit 100 returns the processing to step S41. The master control circuit 100 repeats the above processing. As described above, the synchronization signal transmission unit 162 may transmit the synchronization signal received from the master controller 11 to the plurality of power conversion devices 20 as it is as the second synchronization signal.

Carrier Synchronization Procedure

Figure 17:
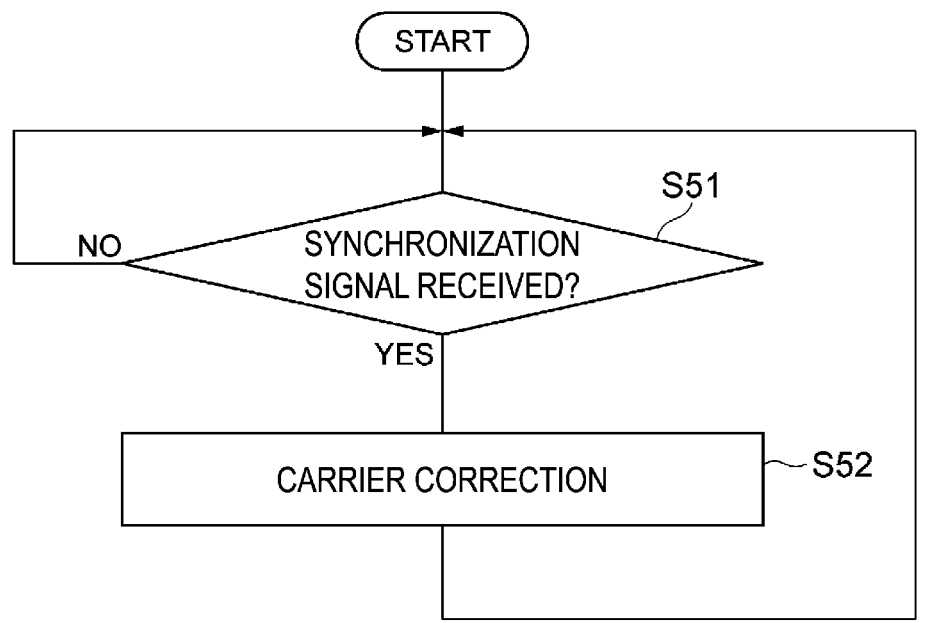
FIG. 17 is a flowchart illustrating a carrier correction procedure.

This procedure is a carrier wave synchronization procedure executed by the slave control circuit 300 of the power conversion device 20. As illustrated in FIG. 17, the slave control circuit 300 sequentially executes steps S51 and S52. In step S51, the carrier correction unit 343 waits for reception of the synchronization signal or the second synchronization signal by communication via the synchronization port CN43.

In step S52, the carrier correction unit 343 synchronizes the carrier wave generated by the carrier generation unit 341 with the received synchronization signal or the second synchronization signal. As a result, the carrier wave in the PWM control circuit 315 is synchronized with the synchronization signal or the second synchronization signal. Thereafter, the master control circuit 100 returns the processing to step S51. The slave control circuit 300 repeats the above processing.

Abnormality Confirmation Result Transmission Procedure

Figure 18:
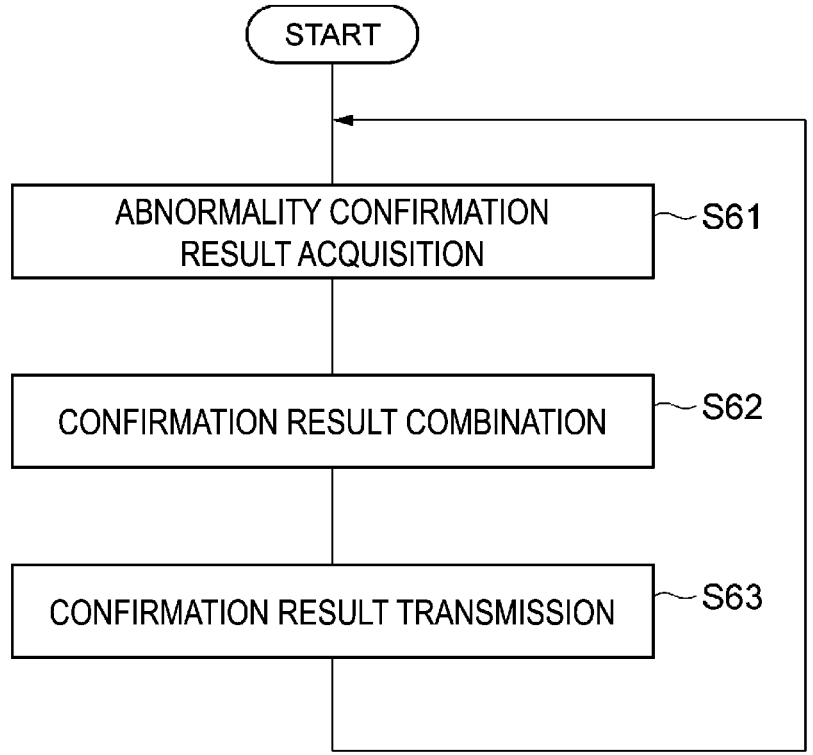
FIG. 18 is a flowchart illustrating an abnormality confirmation result transmission procedure.

This procedure is an abnormality confirmation result transmission procedure executed by the slave control circuit 300 of the power conversion device 20. As illustrated in FIG. 18, the slave control circuit 300 sequentially executes steps S61, S62, and S63. In step S61, the confirmation result acquisition unit 352 acquires the abnormality confirmation result of each own device.

In step S62, the OR operation unit 351 combines the abnormality confirmation result acquired by the confirmation result acquisition unit 352 with the signal transmitted to the master controller 10 by the abnormality notification system CS31 or the third abnormality notification system CS33. For example, the OR operation unit 351 performs the OR operation of the abnormality confirmation result acquired by the confirmation result acquisition unit 352 and the abnormality confirmation result received from the lower power conversion device 20 by communication via the abnormality signal port CN54.

In step S63, the OR operation unit 351 transmits the operation result of the OR operation to the master controller 10 or the upper power conversion device 20 by communication via the abnormality signal port CN44. Thereafter, the slave control circuit 300 returns the processing to step S61. The slave control circuit 300 repeats the above processing.

Abnormality Confirmation Result Transfer Procedure

Figure 19:
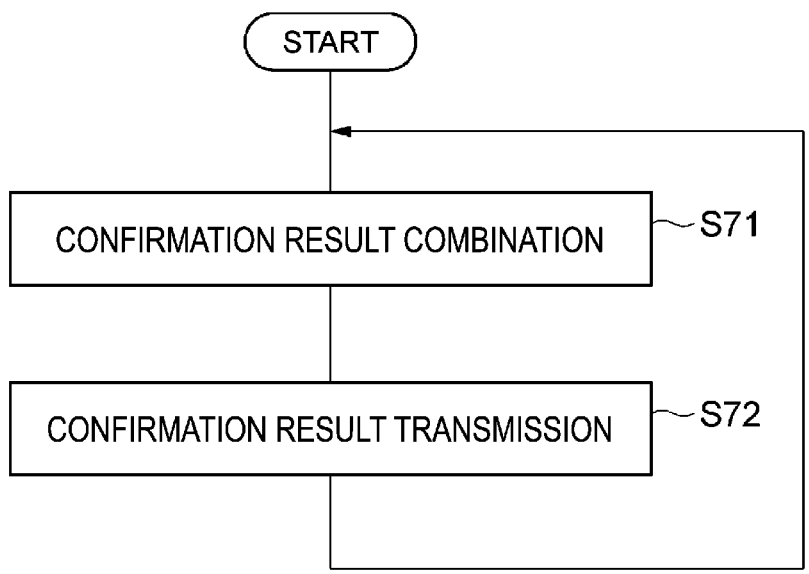
FIG. 19 is a flowchart illustrating an abnormality confirmation result transfer procedure.

This procedure is a procedure in which the master control circuit 100 of the master controller 12 in the secondary mode transfers the abnormality confirmation results of the plurality of power conversion devices 20 of the second group to the master controller 11. As illustrated in FIG. 19, the master control circuit 100 sequentially executes steps S71 and S72. In step S71, the OR operation unit 173 performs the OR operation of the abnormality confirmation result received from the power conversion device 20 by communication via the abnormality signal port CN14 and the abnormality confirmation result received from the power conversion device 20 by communication via the abnormality signal port CN24.

In step S72, the OR operation unit 173 transmits the operation result of the OR operation to the master controller 11 by communication via the abnormality signal port CN34. Thereafter, the master control circuit 100 returns the processing to step S71. The master control circuit 100 repeats the above processing.

Stop Command Transmission Procedure Based on Abnormality Confirmation Result

Figure 20:
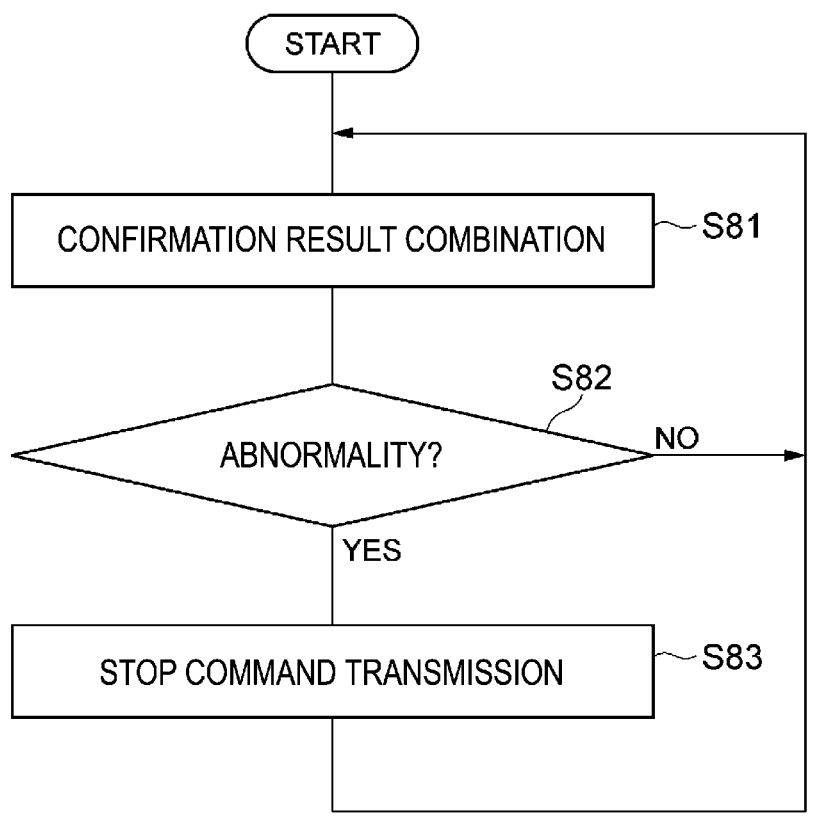
FIG. 20 is a flowchart illustrating a stop command transmission procedure based on an abnormality confirmation result.

This procedure is a stop command transmission procedure executed by the master control circuit 100 of the master controller 11 in the primary mode. As illustrated in FIG. 20, the master control circuit 100 first executes steps S81 and S82.

In step S81, the OR operation unit 172 performs the OR operation of the abnormality confirmation result received from the power conversion device 20 by communication via the abnormality signal port CN14, the abnormality confirmation result received from the power conversion device 20 by communication via the abnormality signal port CN24, and the abnormality confirmation result received from the master controller 12 by communication via the abnormality signal port CN34, and the abnormality signal reception unit 171 acquires the operation result. In step S82, the processor 111 confirms whether there is an abnormality in any of the plurality of power conversion devices 20 and the plurality of power conversion devices 20 of the second group based on the operation result acquired by the abnormality signal reception unit 171.

When it is determined in step S82 that there is no abnormality in any of the plurality of power conversion devices 20 and the plurality of power conversion devices 20 of the second group, the master control circuit 100 returns the processing to step S81.

When it is determined in step S82 that there is an abnormality in any of the plurality of power conversion devices 20 and the plurality of power conversion devices 20 of the second group, the processor 111 causes the stop command transmission unit 181 to transmit the stop command to the plurality of power conversion devices 20 by communication via the stop command ports CN15 and CN25, and causes the stop command transmission unit 181 to transmit the stop command to the master controller 12 by communication via the stop command port CN35. The stop command transmitted to the master controller 12 via the stop command port CN35 is also transmitted to the plurality of power conversion devices 20 of the second group via the stop command ports CN15 and CN25 of the master controller 12. Thereafter, the master control circuit 100 returns the processing to step S81. The master control circuit 100 repeats the above processing.

Stop Control Procedure

Figure 21:
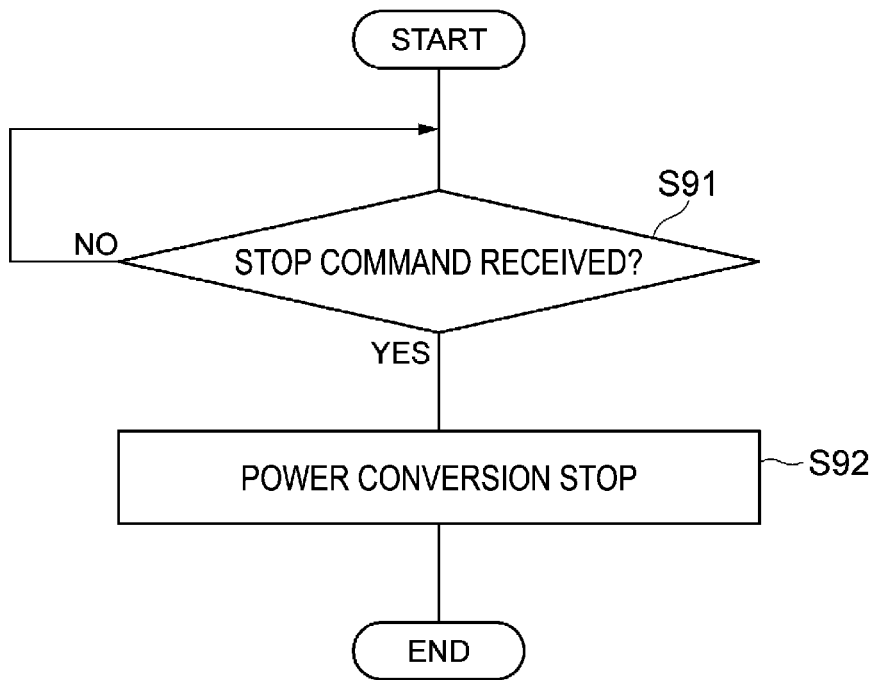
FIG. 21 is a flowchart illustrating a stop control procedure.

This procedure is a procedure in which the slave control circuit 300 of the power conversion device 20 stops the output of the secondary power based on the stop command. As illustrated in FIG. 21, the slave control circuit 300 sequentially executes steps S91 and S92. In step S91, the processor 311 waits for the stop command communication circuit 360 to receive the stop command from the master controller 10 by communication via the stop command port CN45. In step S92, the processor 311 causes the PWM control circuit 315 to stop the output of the secondary power. Thus, the stop control procedure is completed.

Effects of the Present Embodiment

As described above, the power conversion system 1 includes the plurality of power conversion devices 20 and the master controller 10 capable of communicating with the plurality of power conversion devices 20 by the serial communication system CS01. The master controller 10 transmits the control command to the plurality of power conversion devices 20 by serial communication via the serial communication system CS01, and each of the plurality of power conversion devices 20 performs power conversion from the primary power to the secondary power based on the control command.

The configuration in which the plurality of power conversion devices 20 are collectively controlled by the master controller 10 is effective in improving control reliability. In this configuration, by using the serial communication system CS01 to transmit the control command from the master controller 10 to the power conversion devices 20, flexibility in the number of power conversion devices 20 can also be improved. Therefore, it is effective in achieving both device configuration flexibility and control reliability.

The plurality of power conversion devices 20 may include the power conversion device 21A (first power conversion device) and the power conversion devices 21B and 21C (second power conversion devices) capable of communicating with the power conversion device 21A by the serial communication system CS01, the master controller 10 may transmit the control command to the power conversion device 21A by serial communication via the serial communication system CS01, and the power conversion device 21A may transmit the control command received from the master controller 10 to the power conversion devices 21B and 21C by serial communication via the serial communication system CS01. In this case, the serial communication system can be simplified.

The master controller 10 may receive the feedback signals from the plurality of power conversion devices 20 by serial communication via the serial communication system CS01, and may generate the control command based on the received feedback signals. In this case, control reliability is further improved by generating the control command based on the feedback signals from the plurality of power conversion devices 20. In addition, since the transmission and reception of the feedback signal are also performed by serial communication, flexibility in the number of power conversion devices 20 is improved. Therefore, it is further effective in achieving both output flexibility and control reliability.

The plurality of power conversion devices 20 may include the power conversion device 21D (first power conversion device) and the power conversion devices 21B and 21C (second power conversion devices) capable of communicating with the power conversion device 21A by the serial communication system CS01, the power conversion devices 21B and 21C may transmit the second feedback signal to the power conversion device 21A by serial communication via the serial communication system CS01, and the power conversion device 21A may transmit the first feedback signal and the second feedback signal received from the power conversion devices 21B and 21C to the master controller 10 by serial communication via the serial communication system CS01. In this case, the wiring can be further simplified.

The master controller 10 can communicate with the plurality of power conversion devices 20 also by the start command system CS11 different from the serial communication system CS01, each of the plurality of power conversion devices 20 may transmit the reception notification of the control command to the master controller 10 by serial communication via the serial communication system CS01 when receiving the control command, the master controller 10 may transmit the start command to each of the plurality of power conversion devices 20 by the start command system CS11 when receiving the reception notifications of the control commands from all of the plurality of power conversion devices 20, and each of the plurality of power conversion devices 20 may start power conversion based on the received control command when receiving the start command. In this case, after waiting for all the power conversion devices 20 to receive the control command, the power conversion devices 20 can simultaneously start power conversion based on the control command. Therefore, control reliability can be further improved.

The master controller 10 can communicate with the plurality of power conversion devices 20 also by the abnormality notification system CS01 different from the serial communication system CS31, and can communicate with the plurality of power conversion devices 20 also by the stop command system CS01 different from the serial communication system CS31 and the abnormality notification system CS41, each of the plurality of power conversion devices 20 may transmit the abnormality confirmation result to the master controller 10 by the abnormality notification system CS31, the master controller 10 may transmit the stop command to the plurality of power conversion devices 20 by the stop command system CS41 when there is an abnormality in any of the plurality of power conversion devices 20, and each of the plurality of power conversion devices 20 may stop output of secondary power when receiving the stop command. In this case, it is possible to suppress an abnormality detection delay due to a serial communication error and further suppress a stopping delay in response to the abnormality detection. Therefore, control reliability can be further improved.

The plurality of power conversion devices 20 may be communicatively connected in series to the master controller 10 by the abnormality notification system CS31, and may be communicatively connected in parallel to the master controller 10 by the stop command system CS41. In this case, both reliable information transmission and wiring simplification can be achieved.

Each of the plurality of power conversion devices 20 may combine the signal indicating the abnormality confirmation result with the signal transmitted to the master controller 10 by the abnormality notification system CS31. In this case, it is possible to more reliably achieve both reliable information transmission and wiring simplification.

The master controller 10 can also communicate with the plurality of power conversion devices 20 also by the synchronization system CS21 different from the serial communication system CS01, and may transmit the synchronization signal to the plurality of power conversion devices 20 by the synchronization system CS21. Each of the plurality of power conversion devices 20 may synchronize the carrier wave with the synchronization signal when receiving the synchronization signal, and may perform power conversion based on the control command by switching on and off one or more switching elements 38 in a cycle of the carrier wave. In this case, a synchronization delay due to a serial communication error can be suppressed. Therefore, control reliability can be further improved.

The master controller 11 may further communicate with a master controller 12 (second master controller) by the second serial communication system CS02, and the master controller 11 may be configured to switch an operation mode between the primary mode and the secondary mode. In the primary mode, the master controller 11 may transmit the control command to the plurality of power conversion devices 21A, 21B, 21C, 21D, 21E, and 21F by serial communication via the serial communication system CS01, and may transmit the control command to the master controller 12 by serial communication via the second serial communication system CS02. In the secondary mode, the master controller 11 may receive the control command from the master controller 12 by serial communication via the second serial communication system CS02, and transmit the received control command to the plurality of power conversion devices 21A, 21B, 21C, 21D, 21E, and 21F by serial communication via the serial communication system CS01. In this case, by combining the master controller 11 and another master controller 12, the flexibility in the number of power conversion devices 20 can be further improved. In addition, by sharing hardware between the primary mode and the secondary mode, the versatility of the master controller 10 is improved.

In the primary mode, the master controller 11 may receive the feedback signals of the first group from the plurality of power conversion devices 21A, 21B, 21C, 21D, 21E, and 21F by serial communication via the serial communication system CS01, receive the feedback signals of the second group from the master controller 12 (second master controller) by serial communication via the second serial communication system CS02, and generate the control command based on the feedback signals of the first group and the feedback signals of the second group. In the secondary mode, the master controller 11 may the receive feedback signals from the plurality of power conversion devices 21A, 21B, 21C, 21D, 21E, and 21F by serial communication via the serial communication system CS01, and transmit the received feedback signals to the master controller 12 by serial communication via the second serial communication system CS02. In this case, the versatility of the master controller 10 is further improved.

The power conversion system 1 may further include the plurality of power conversion devices 22A, 22B, 22C, 22D, 22E, and 22F of the second group, and the master controller 12 capable of communicating with the master controller 11 by the second serial communication system CS02 and capable of communicating with the plurality of power conversion devices 22A, 22B, 22C, 22D, 22E, and 22F of the second group by the third serial communication system CS03. The master controller 11 may transmit the control command to the plurality of power conversion devices 21A, 21B, 21C, 21D, 21E, and 21F by serial communication via the serial communication system CS01, and may transmit the control command to the master controller 12 by serial communication via the second serial communication system CS02, and the master controller 12 may receive the control command from the master controller 11 and transmit the received control command to the plurality of power conversion devices 22A, 22B, 22C, 22D, 22E, and 22F of the second group by serial communication via the third serial communication system CS03. In this case, the flexibility in the number of power conversion devices 20 can be further improved.

The master controller 12 may receive the feedback signals of the second group from the plurality of power conversion devices 22A, 22B, 22C, 22D, 22E, and 22F of the second group by serial communication via the third serial communication system CS03, and may transmit the received the feedback signals of the second group to the master controller 11 by serial communication via the second serial communication system CS02. The master controller 11 may receive the feedback signals of the first group from the plurality of power conversion devices 21A, 21B, 21C, 21D, 21E, and 21F by serial communication via the serial communication system CS01, receive the feedback signals of the second group from the master controller 12 by serial communication via the second serial communication system CS02, and generate the control command based on the feedback signals of the first group and the feedback signals of the second group. In this case, the flexibility in the number of power conversion devices 20 can be further improved.

As described above, the present disclosure is not necessarily limited to the above described embodiments, and various modifications can be made without departing from the gist of the disclosure.

REFERENCE SIGNS LIST

1 Power conversion system
10 Master controller

11, 12 Master controller (second master controller)
20 Power conversion device
21A, 21D, 22A, 22D Power conversion device (first power conversion device)
21B, 21C, 21E, 21F, 22B, 22C, 22E, 22F Power conversion device (second power conversion device)
38 Switching element
CS01 Serial communication system
CS02 Second serial communication system
CS03 Third serial communication system
CS11 Start command system
CS21 Synchronization system
CS31 Abnormality notification system
CS41 Stop command system

The invention claimed is:

1. A power conversion system, comprising:
a plurality of power conversion devices; and
a master controller that communicates with the plurality of power conversion devices via a serial communication system, wherein
the master controller transmits a single control command to the plurality of power conversion devices by serial communication via the serial communication system,
each of the plurality of power conversion devices performs power conversion from a primary power to a secondary power based on the single control command,
the master controller further communicates with a second master controller via a second serial communication system, and
the master controller:
switches an operation mode between a primary mode and a secondary mode,
in the primary mode, transmits the single control command to the plurality of power conversion devices by serial communication via the serial communication system and transmits the single control command to the second master controller by serial communication via the second serial communication system, and
in the secondary mode, receives the single control command from the second master controller by serial communication via the second serial communication system and transmits the single control command to the plurality of power conversion devices by serial communication via the serial communication system.

2. The power conversion system according to claim 1, wherein
the plurality of power conversion devices include a first power conversion device and a second power conversion device that communicates with the first power conversion device via the serial communication system,
the master controller transmits the single control command to the first power conversion device by serial communication via the serial communication system, and
the first power conversion device transmits the single control command received from the master controller to the second power conversion device by serial communication via the serial communication system.

3. The power conversion system according to claim 1, wherein the master controller:
receives a plurality of feedback signals from the plurality of power conversion devices by serial communication via the serial communication system, and generates the single control command based on the received plurality of feedback signals.

4. The power conversion system according to claim 3, wherein
the plurality of power conversion devices include a first power conversion device and a second power conversion device that communicates with the first power conversion device via the serial communication system,
the plurality of feedback signals include a first feedback signal from the first power conversion device and a second feedback signal from the second power conversion device,
the second power conversion device transmits the second feedback signal to the first power conversion device by serial communication via the serial communication system, and
the first power conversion device transmits the first feedback signal and the second feedback signal received from the second power conversion device to the master controller by serial communication via the serial communication system.

5. The power conversion system according to claim 1, wherein
the master controller communicates with the plurality of power conversion devices also via a start command system different from the serial communication system,
when each of the plurality of power conversion devices receives the single control command, each of the plurality of power conversion devices transmits a reception notification of the single control command to the master controller by serial communication via the serial communication system,
when the master controller receives the reception notification from all of the plurality of power conversion devices, the master controller transmits a start command to the plurality of power conversion devices via the start command system, and
when each of the plurality of power conversion devices receives the start command, each of the plurality of power conversion devices starts the power conversion based on the single control command.

6. The power conversion system according to claim 5, wherein the plurality of power conversion devices receive, in paralle, the start command from the master controller via the start command system.

7. The power conversion system according to claim 1, wherein
the master controller communicates with:
the plurality of power conversion devices also via an abnormality notification system different from the serial communication system, and
the plurality of power conversion devices also via a stop command system different from the serial communication system and the abnormality notification system,
each of the plurality of power conversion devices transmits an abnormality confirmation result to the master controller via the abnormality notification system,
when there is an abnormality in any of the plurality of power conversion devices, the master controller transmits a stop command to the plurality of power conversion devices via the stop command system, and
when each of the plurality of power conversion devices receives the stop command, each of the plurality of power conversion devices stops output of the secondary power.

8. The power conversion system according to claim 7, wherein the plurality of power conversion devices receive, in parallel, the stop command from the master controller via the stop command system.

9. The power conversion system according to claim 8, wherein each of the plurality of power conversion devices combines a signal indicating the abnormality confirmation result with an abnormality confirmation signal transmitted to the master controller via the abnormality notification system, and the master controller receives the abnormality confirmation signal combined with the signal indicating the abnormality confirmation result of each of the plurality of power conversion devices.

10. The power conversion system according to claim 1, wherein the master controller:

communicates with the plurality of power conversion devices also via a synchronization system different from the serial communication system, and transmits a synchronization signal to the plurality of power conversion devices via the synchronization system, and when each of the plurality of power conversion devices receives the synchronization signal, each of the plurality of power conversion devices:

synchronizes a carrier wave with the synchronization signal, and performs the power conversion based on the single control command by switching on and off one or more switching elements in a cycle of the carrier wave.

11. The power conversion system according to claim 10, wherein the plurality of power conversion devices receive, in parallel, the synchronization signal from the master controller via the synchronization system.

12. The power conversion system according to claim 1, wherein the master controller transmits, as the single control command, a single voltage command, and each of the plurality of power conversion devices performs the power conversion to generate a secondary voltage according to the single voltage command.

13. The power conversion system according to claim 1, wherein the master controller:

in the primary mode, receives feedback signals of a first group from the plurality of power conversion devices by serial communication via the serial communication system, receives feedback signals of a second group from the second master controller by serial communication via the second serial communication system, and generates the single control command based on the feedback signals of the first group and the feedback signals of the second group, and in the secondary mode, receives a plurality of feedback signals from the plurality of power conversion devices by serial communication via the serial communication system and transmits the received plurality of feedback signals to the second master controller by serial communication via the second serial communication system.

14. The power conversion system according to claim 1, further comprising:

power conversion devices of a second group; and a second master controller that communicates with:

the master controller via a second serial communication system, and the power conversion devices of the second group via a third serial communication system, wherein the master controller transmits:

the single control command to power conversion devices of a first group, which corresponds to the plurality of power conversion devices, by serial communication via the serial communication system, and the single control command to the second master controller by serial communication via the second serial communication system, and the second master controller:

receives the single control command from the master controller, and transmits the single control command to the power conversion devices of the second group by serial communication via the third serial communication system.

15. The power conversion system according to claim 14, wherein the second master controller:

receives feedback signals of the second group from the power conversion devices of the second group by serial communication via the third serial communication system, and transmits the received feedback signals of the second group to the master controller by serial communication via the second serial communication system, and the master controller:

receives feedback signals of the first group from the power conversion devices of the first group by serial communication via the serial communication system, receives the feedback signals of the second group from the second master controller by serial communication via the second serial communication system, and generates the single control command based on the feedback signals of the first group and the feedback signals of the second group.

16. A power conversion system, comprising:

a plurality of power conversion devices; and a master controller that communicates with the plurality of power conversion devices via a communication system and a start command system different from the communication system, wherein the master controller transmits a single control command to the plurality of power conversion devices via the communication system, when each of the plurality of power conversion devices receives the single control command, each of the plurality of power conversion devices transmits a reception notification of the single control command to the master controller via the communication system, when the master controller receives the reception notification from all of the plurality of power conversion devices, the master controller transmits a start command to the plurality of power conversion devices via the start command system, and when each of the plurality of power conversion devices receives the start command, each of the plurality of power conversion devices starts power conversion based on the single control command.

17. The power conversion system according to claim 16, wherein the plurality of power conversion devices include a first power conversion device and a second power conversion device that communicates with the first power conversion device via the communication system, the master controller transmits the single control command to the first power conversion device via the communication system, and the first power conversion device transmits the single control command received from the master controller to the second power conversion device via the communication system.

18. The power conversion system according to claim 16, wherein the master controller:

receives a plurality of feedback signals from the plurality of power conversion devices via the communication system, and generates the single control command based on the received plurality of feedback signals.

19. The power conversion system according to claim 18, wherein the plurality of power conversion devices include a first power conversion device and a second power conversion device that communicates with the first power conversion device via the communication system, the plurality of feedback signals include a first feedback signal from the first power conversion device and a second feedback signal from the second power conversion device, the second power conversion device transmits the second feedback signal to the first power conversion device via the communication system, and the first power conversion device transmits the first feedback signal and the second feedback signal received from the second power conversion device to the master controller via the communication system.

* * * * *